(12) United States Patent
Li et al.

(10) Patent No.: US 12,013,485 B2
(45) Date of Patent: Jun. 18, 2024

(54) MULTI-SCALE INSPECTION AND INTELLIGENT DIAGNOSIS SYSTEM AND METHOD FOR TUNNEL STRUCTURAL DEFECTS

(71) Applicant: SHANDONG UNIVERSITY, Shandong (CN)

(72) Inventors: Shucai Li, Jinan (CN); Bin Liu, Jinan (CN); Zhengfang Wang, Jinan (CN); Peng Jiang, Jinan (CN); Fengkai Zhang, Jinan (CN); Hanchi Liu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 528 days.

(21) Appl. No.: 17/289,139

(22) PCT Filed: Sep. 30, 2020

(86) PCT No.: PCT/CN2020/119581
§ 371 (c)(1),
(2) Date: Apr. 27, 2021

(87) PCT Pub. No.: WO2021/068848
PCT Pub. Date: Apr. 15, 2021

(65) Prior Publication Data
US 2021/0396842 A1 Dec. 23, 2021

(30) Foreign Application Priority Data

Oct. 9, 2019 (CN) .......................... 201910955502.2
Jan. 7, 2020 (CN) .......................... 202010014715.8
(Continued)

(51) Int. Cl.
*G01S 7/41* (2006.01)
*B25J 5/00* (2006.01)
(Continued)

(52) U.S. Cl.
CPC ................. *G01S 7/41* (2013.01); *B25J 5/007* (2013.01); *B25J 15/0019* (2013.01); *G01M 3/38* (2013.01);
(Continued)

(58) Field of Classification Search
CPC . B25J 5/007; B25J 9/161; B25J 9/1697; B25J 19/021; B25J 5/005; B25J 15/0019;
(Continued)

(56) References Cited

FOREIGN PATENT DOCUMENTS

CN 201989147 U 9/2011
CN 105512635 A 4/2016
(Continued)

OTHER PUBLICATIONS

Liu et al., CN 108731736 A, "Automatic Wall-climbing Radar Photoelectric Robot System For Non-destructive Detection And Diagnosis Of Bridge Tunnel Structure Disease", Date published: Nov. 2, 2018 (Year: 2018).*
(Continued)

*Primary Examiner* — John H Le
(74) *Attorney, Agent, or Firm* — Oliff PLC

(57) ABSTRACT

A multi-scale inspection and intelligent diagnosis system and method for tunnel structural defects includes: a traveling section; a supporting section, disposed on the traveling section, and including a rotatable telescopic platform, where two mechanical arms working in parallel are disposed on the rotatable telescopic platform; an inspection section, mounted on the supporting section, and configured to perform multi-scale inspection on surface defects and internal defects in different depth ranges of a same position of a tunnel structure, and transmit inspected defect information to a control section; and the control section, configured to: construct a deep neural network-based defect diagnosis model; construct a data set by using historical surface defect
(Continued)

and internal defect information, and train the deep neural network-based defect diagnosis model; and receive multi-scale inspection information in real time, and automatically recognize types, positions, contours, and dielectric attributes of the internal and surface defects.

4 Claims, 12 Drawing Sheets

(30) Foreign Application Priority Data

Jan. 7, 2020 (CN) .......................... 202010014732.1
Jan. 21, 2020 (CN) .......................... 202010071046.8

(51) Int. Cl.
| | |
|---|---|
| *B25J 15/00* | (2006.01) |
| *F16L 101/30* | (2006.01) |
| *G01M 3/38* | (2006.01) |
| *G01N 23/203* | (2006.01) |
| *G01N 29/06* | (2006.01) |
| *G01S 13/88* | (2006.01) |
| *G05D 1/00* | (2024.01) |
| *G06N 3/08* | (2023.01) |

(52) U.S. Cl.
CPC ......... *G01N 23/203* (2013.01); *G01N 29/069* (2013.01); *G01S 13/885* (2013.01); *G05D 1/0212* (2013.01); *G06N 3/08* (2013.01); *F16L 2101/30* (2013.01); *G01N 2223/628* (2013.01); *G01N 2223/646* (2013.01); *G01N 2291/0289* (2013.01)

(58) Field of Classification Search
CPC .... G01S 13/862; G01S 13/865; G01S 13/885; G01S 17/88; G01S 7/41; G01S 7/417; G01S 15/88; G01N 29/043; G01N 29/069; G01N 29/0618; G01N 29/225; G01N 29/265; G01N 29/4427; G01N 29/4481; G01N 21/88; G01N 23/203; G06N 3/045; G06N 3/08; G01M 3/38; G05D 1/0212

USPC .......................................................... 702/39
See application file for complete search history.

(56) References Cited

FOREIGN PATENT DOCUMENTS

| | | |
|---|---|---|
| CN | 106501866 A | 3/2017 |
| CN | 107621626 A | 1/2018 |
| CN | 108229461 A | 6/2018 |
| CN | 108303426 A | 7/2018 |
| CN | 108731736 A | 11/2018 |
| CN | 109262583 A | 1/2019 |
| CN | 209132427 U | 7/2019 |
| CN | 110161043 A | 8/2019 |
| CN | 209311671 U | 8/2019 |
| CN | 110270975 A | 9/2019 |
| CN | 111160204 A | 5/2020 |
| CN | 111323764 A | 6/2020 |
| JP | 2008-020426 A | 1/2008 |
| KR | 10-2011-0066360 A | 6/2011 |

OTHER PUBLICATIONS

Zhou et al., CN 209132427 U, "A Fast Detection Robot Device For Tunnel Geological Radar", Date published: Jul. 19, 2019 (Year: 2019).*

Wei et al.; "Research on Quality Detection Trolley Design of Geological Radar Law Tunnel Lining;" Modern tunnel technology; 2019; pp. 179-181; Section S1.

Hui Xu; "Deep Learning Based Intelligent Inversion and Identification Method for GPR Detection of Tunnel Lining Diseases;" China Excellent Master Dissertation Full-text Database (Engineering Technology Series II); 2019; pp. 11-79; Issue No. 9.

Tong; "Research on pavement structure disease detection based on deep learning and ground penetrating radar technology;" China Excellent Master Dissertation Full-text Database (Basic Science); 2019; pp. 28-45; Issue No. 09.

Jan. 7, 2021 Search Report issued in International Patent Application No. PCT/CN2020/119581.

Jan. 7, 2021 Written Opinion of the International Searching Authority issued in International Patent Application No. PCT/CN2020/119581.

* cited by examiner

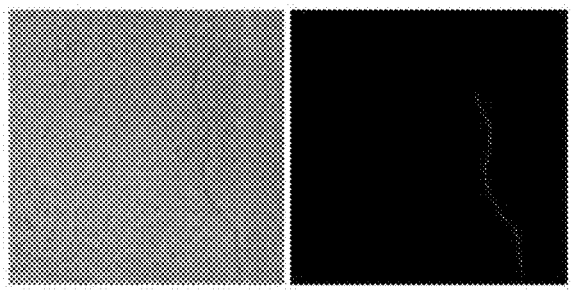 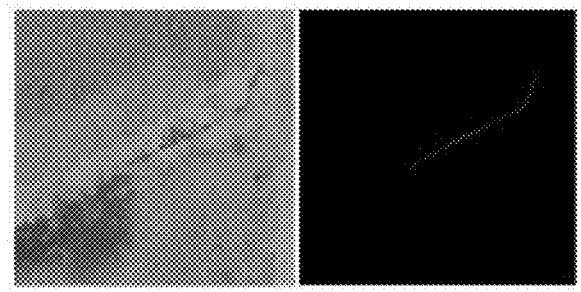
FIG. 5(a)  FIG. 5(b)  FIG. 5(c)  FIG. 5(d)
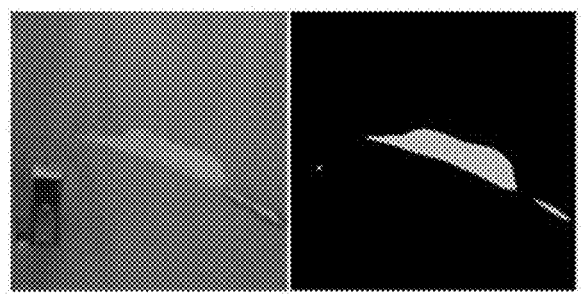 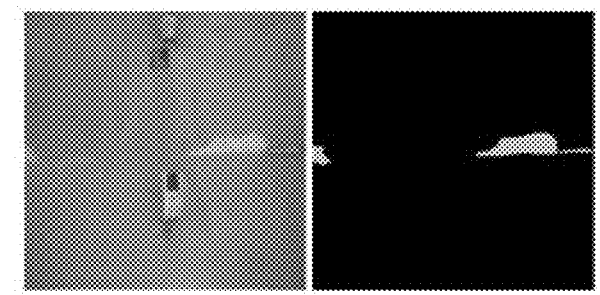
FIG. 5(e)  FIG. 5(f)  FIG. 5(g)  FIG. 5(h)
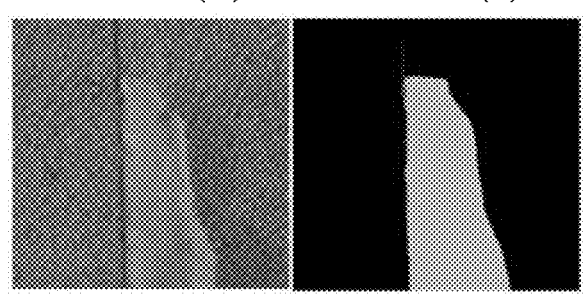 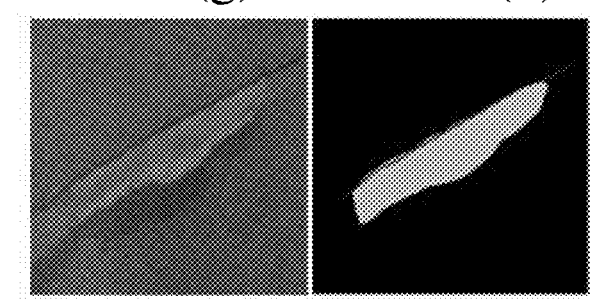
FIG. 5(i)  FIG. 5(j)  FIG. 5(k)  FIG. 5(l)

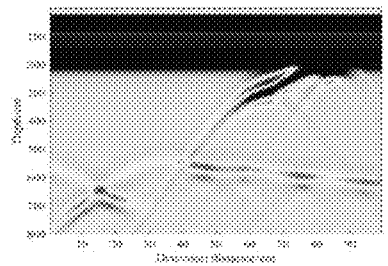 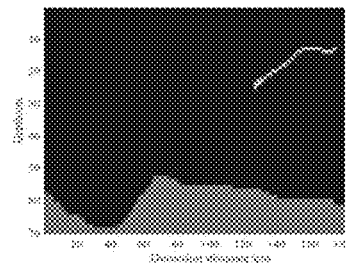 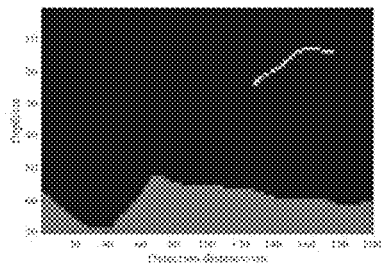
FIG. 19(a)  FIG. 19(b)  FIG. 19(c)
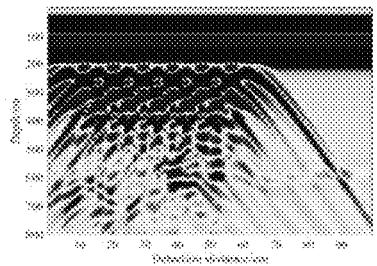 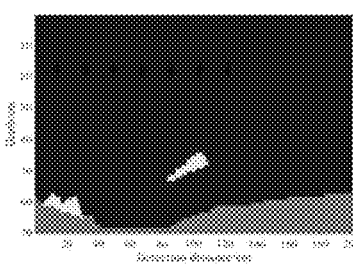 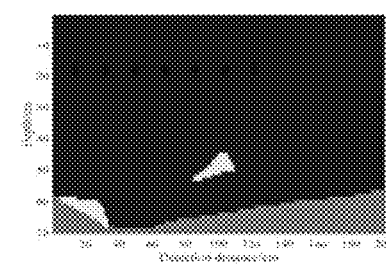
FIG. 20(a)  FIG. 20(b)  FIG. 20(c)
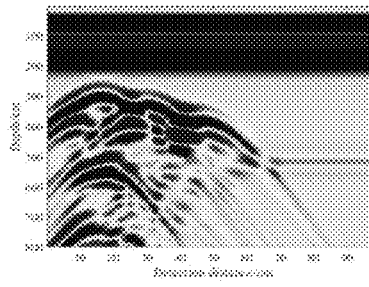 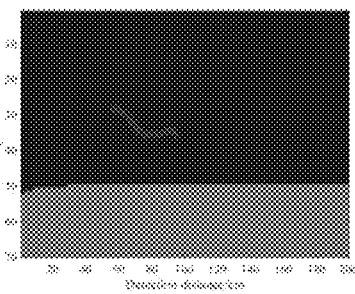 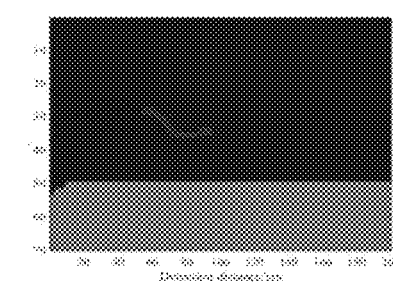
FIG. 21(a)  FIG. 21(b)  FIG. 21(c)

MULTI-SCALE INSPECTION AND INTELLIGENT DIAGNOSIS SYSTEM AND METHOD FOR TUNNEL STRUCTURAL DEFECTS

BACKGROUND

Technical Field

The present disclosure belongs to the field of tunnel inspection and diagnosis, and in particular, to a multi-scale inspection and intelligent diagnosis system and method for tunnel structural defects.

Related Art

The description in this section merely provides background information related to the present disclosure and does not necessarily constitute the prior art.

As highways, railways, subways and other tunnels are put into operation one after another, the importance of structural safety and healthy service in the operation period has become increasingly prominent. During the long-term service, due to the combined action of factors such as structural performance degradation, natural environment changes, surrounding environmental disturbances, and differences in construction quality, a large number of operating tunnels have concealed structural defects such as lining cracks, internal voids, water seepage and mud leakage.

The foregoing defects extremely easily lead to structural performance degradation, reduced tunnel life, and even affect driving safety, cause safety accidents, and seriously threaten the healthy service of the tunnel. There is an urgent need for accurate and efficient inspection and diagnosis equipment and methods for the concealed defects inside the tunnel, to inspect and diagnose the surface and internal defects of the tunnel structure, to provide a scientific basis for the treatment of defects of the tunnel structure.

The inventor finds that the currently mainly used tunnel structure surface and internal defect inspection technology mainly has the following problems:

(1) At present, the inspection of the internal defects of the tunnel structure is mainly performed by manual inspection. The manner of manually holding a ground penetrating radar or using an aerial platform is used, which has low inspection efficiency, poor convenience and high costs.

(2) The existing tunnel inspection robots have a single inspection method, most of which are equipped with video images, laser point clouds and other devices, and a few are equipped with infrared imaging devices to inspect defects such as cracks, peeling-off, and water leakage on the surface of the tunnel structure, but the internal defects of the structure cannot be inspected, and the multi-scale fine inspection of the tunnel lining structural defects from the outside to the inside has not been realized.

(3) Nondestructive inspection technologies such as ground penetrating radar and ultrasound that can be used for the inspection of internal defects of tunnel structures can only inspect centimeter-level damage inside the concrete lining, and it is difficult to perform precise inspection of millimeter-level damage.

(4) The current diagnosis of internal damage mainly relies on engineering experience, and is subjective. It is difficult to effectively ensure the accuracy of defect diagnosis, and the level of intelligence is low.

SUMMARY

To resolve the foregoing problems, a first aspect of the present disclosure provides a multi-scale inspection and intelligent diagnosis system for tunnel structural defects, and the system can perform automatic inspection on a tunnel structure, and perform fine inspection and intelligent diagnosis on millimeter-level damage, so that the convenience and accuracy of lining defect inspection and diagnosis can be greatly improved.

To achieve the foregoing objective, the present disclosure uses the following technical solutions:

A multi-scale inspection and intelligent diagnosis system for tunnel structural defects, including:
  a traveling section;
  a supporting section, disposed on the traveling section, and including a rotatable telescopic platform, where two mechanical arms working in parallel are disposed on the rotatable telescopic platform;
  an inspection section, mounted on the supporting section, and configured to perform multi-scale inspection on surface defects and internal defects in different depth ranges of a same position of a tunnel structure, and transmit inspected defect information to a control section; and
  the control section, configured to:
  construct a deep neural network-based defect diagnosis model;
  construct a data set by using historical surface defect and internal defect information and a marked pixel-level defect type, and train the deep neural network-based defect diagnosis model; and
  receive defect information in real time and input the received defect information into a trained defect automatic recognition and diagnosis model, and automatically recognize a type, a position, and a contour of a defect.

Further, the traveling section includes a robot platform, tracks are disposed on two sides of the robot platform, several telescopic rail wheels are further symmetrically disposed on a bottom of the robot platform, and the telescopic rail wheels perform joint telescopic movement by using a linkage mechanism, to implement operation in tunnels with different hole diameters.

Further, one of the two mechanical arms is a multi-joint snake-shaped mechanical arm, and the other is a load measuring arm with a built-in inspection device.

Further, the inspection section includes:
  a laser 3D scanner, mounted on the rotatable telescopic platform, and configured to acquire tunnel panorama image information including defects of cracks and water leakage on a tunnel lining surface;
  a ground penetrating radar and ultrasonic imaging device, placed on a top end of the multi-joint snake-shaped mechanical arm, where a ground penetrating radar is configured to obtain defects of deeper layers, and an ultrasonic imaging device is configured to obtain depths and widths of the cracks on the tunnel lining surface; and
  an X-ray backscattering device, built in the load measuring arm with a built-in inspection device, and configured to perform millimeter-level measurement on the inside of the cracks on the tunnel lining surface.

Further, the control section is further configured to:

store the defect information received in real time and the automatically recognized defect type into a historical database;

train the defect diagnosis model again by using data in the historical database, to obtain an updated defect diagnosis model; and perform defect diagnosis by using the updated defect diagnosis model.

Further, the control section is further configured to:

position and frame a tunnel environment, and perform path planning on the traveling section.

One or more embodiments provide a self-adaptive floating type coupled device, disposed on an end of a telescopic mechanical arm, and including:

a housing, configured to mount a nondestructive inspection device therein, where one or more telescopic elastic wheels are provided on an outer surface of the housing, and are configured to bond to a measured surface of a tunnel lining, and a force transducer is built in each telescopic elastic wheel for sensing a bonding force between the self-adaptive floating type coupled device and the measured surface of the tunnel lining; and a laser ranging sensor array is further provided on the outer surface of the housing for monitoring a distance between the self-adaptive floating type coupled device and the measured surface; and both the force transducer and the laser ranging sensor array are connected to a controller, and the controller adjusts a relative position between the self-adaptive floating type coupled device and the measured surface according to information about the bonding force and the distance.

Further, the telescopic elastic wheel includes a rod member connected to the outer surface of the housing, an end of the rod member is connected to an end of the force transducer, and the other end of the force transducer is connected to an end of a spring, both the force transducer and the spring are accommodated in a columnar accommodating cavity, an end of the columnar accommodating cavity away from the rod member is blocked, and the other end is provided with an opening, and a size of the opening enables the columnar accommodating cavity to be sleeved outside the rod member, and an outer side of the blocked end of the columnar accommodating cavity is connected to a walking wheel by using a bracket.

Further, the laser ranging sensor array is mounted on at least three side surfaces of the housing, and one of the side surfaces is a side surface facing toward an advancing direction.

Further, a nondestructive inspection device fixing platform is further disposed in the housing, and clamping slots capable of mounting probes of different inspection devices are reserved on the nondestructive inspection device fixing platform; and the nondestructive inspection device fixing platform includes a horizontal guide rail and two vertical guide rails vertically connected to the horizontal guide rail; gears are respectively disposed on two ends of the horizontal guide rail, and are respectively engaged with racks disposed on two opposite side surfaces in the housing; a rack is disposed on a side for fixing a nondestructive inspection device of the horizontal guide rail, and the two vertical guide rails are engaged with the rack on the horizontal guide rail by using gears.

Further, an obstacle avoidance monitoring device is further provided on an outer surface of the housing facing toward an advancing direction, and the obstacle avoiding monitoring device is composed of a laser radar and a surveillance camera, which are both connected to the controller, for monitoring front lining surface information in a running process.

Further, the end of the mechanical arm is connected to the self-adaptive floating type coupled device by using a foldable arched push-open device, the foldable arched push-open device includes a plurality of supporting frames connected to each other, and two adjacent supporting frames are connected through rotation of a rotary shaft, and the rotary shaft is driven by a reducer; each supporting frame is provided with an electric guide rail in a direction consistent with the supporting frame, and the self-adaptive floating type coupled device is connected to the electric guide rail by using a pulley, and is capable of moving along the electric guide rail.

Further, laser ranging sensors are disposed on both two ends of the electric guide rail, for sensing a distance from the measured surface; a torque sensor is disposed on an output shaft of the reducer for sensing a rotation angle between two supporting rods; the reducer, the laser ranging sensors, and the torque sensor are all connected to the controller, and the controller adjusts angles between the supporting frames by controlling the reducer according to angles between the supporting rods and the distance from the measured surface.

Further, a position sensor is disposed on a pulley for sensing a position of the self-adaptive floating type coupled device on the corresponding electric guide rail.

One or more embodiments provide a multifunctional gimbal, disposed on a robot platform, where a plurality of inspection modules are provided in the gimbal, including a laser ranging module and a plurality of defect inspection modules, which are all connected to a controller, where the laser ranging module is disposed at a center, and the plurality of defect inspection modules are disposed around the laser ranging module; and the controller controls orientations of the plurality of defect inspection modules based on a distance measured by the laser ranging module from a measured surface, so that the plurality of defect inspection modules perform imaging on a same target region.

Further, the plurality of defect inspection modules include: a three-dimensional modeling and deformation inspection module, a crack and peeling-off inspection module, and a leakage inspection module; and the gimbal is hemispherical, and four holes are provided on a hemispherical section, for accommodating a laser emitting unit of the three-dimensional modeling and deformation inspection module, a visible light camera of the crack and peeling-off inspection module, an infrared camera of the leakage inspection module, and a laser emitting unit of the laser ranging module, and sizes of the four holes all reserve additional space for rotation of the laser emitting unit or the camera, where the laser emitting unit of the laser ranging module is located at a center, and the visible light camera and the infrared camera are respectively disposed on two sides of the laser emitting unit equidistantly, and the three are collinear.

Further, the plurality of defect inspection modules include: a three-dimensional modeling and deformation inspection module, a crack and peeling-off inspection module, and a leakage inspection module; and the plurality of inspection modules are all fixed in the multifunctional gimbal by using a supporting mechanism, the laser ranging module is disposed in the middle of the supporting mechanism, and the crack and peeling-off inspection module and the leakage inspection module are respectively disposed on two sides of the laser ranging module, and are disposed on the supporting mechanism by using a steering motor.

Further, the gimbal is hemispherical, and two sides are separately connected to inside of a U-shaped bracket by using a lateral-roll motor, the U-shaped bracket is connected to a moving carrier by using a vertical-roll motor, both the lateral-roll motor and the vertical-roll motor are provided with a torque sensor, the U-shaped bracket is provided with a three-axis gyroscope, and both the torque sensor and the three-axis gyroscope are connected to the controller.

Further, positions of the plurality of inspection modules in the gimbal are initialized according to initial gravity information of the inspection modules and offset information of gravity centers of the inspection modules relative to three motor rotary shafts, to ensure stability of the gimbal.

One or more embodiments provide a target intelligent recognition method based on ground penetrating radar exploratory data, including the following steps:

obtaining a computer simulated data set, where the data set includes a plurality of ground penetrating radar data sectional view-target tag drawing data pairs;

training based on the data set by using a deep learning network, to obtain a target recognition model; and obtaining ground penetrating radar inspection data acquired in real time, and performing target recognition by using the target recognition model.

Further, constructing the computer simulated data set includes:

simulating dielectric constant models of underground engineering targets of a plurality of background media, shapes, sizes, and distributions;

performing forward modeling on each dielectric constant model, to separately generate ground penetrating radar data sectional views of different frequencies, to obtain a plurality of ground penetrating radar data sectional view-target dielectric constant model data pairs; and performing contour recognition on a target dielectric constant model in each ground penetrating radar data sectional view-target dielectric constant model data pair, and assigning a corresponding type identification code to a pixel value within a contour range, to obtain the plurality of ground penetrating radar data sectional view-target tag drawing data pairs.

Further, a model architecture of the deep learning network includes: a time dimension compression network structure configured to perform feature extraction on a ground penetrating radar inspection data sectional view, a self-encoding network structure configured to encode each feature channel, and a tag drawing decoding network structure configured to decode each feature channel;

the time dimension compression network structure includes six layers of convolution structures cascaded in sequence, an output end of a second layer of convolution structure is further connected to an input end of a residual block, and an output end of the residual block is connected to an input end of a third layer of convolution structure;

the self-encoding network structure includes four fully-connected layers; and the tag drawing decoding network structure includes six layers of convolution structures cascaded in sequence, an output end of a second layer of convolution structure is further connected to an input end of a residual block, and an output end of the residual block is connected to an input end of a third layer of convolution structure.

Further, a plurality of real ground penetrating radar data sectional view-target tag drawing data pairs are further obtained, and parameter adjustment is performed on the obtained target recognition model.

Beneficial effects of the present disclosure are as follows:

The multi-scale inspection and intelligent diagnosis system for tunnel structural defects of the present disclosure includes the inspection section and the control section. Multi-scale inspection is performed on the surface defects and internal defects in different depth ranges of the same position of the tunnel structure by using the inspection section, and the inspected defect information is transmitted to the control section. In the control section, the defect type is automatically recognized by using the trained defect diagnosis model, to implement integration and automation of inspection and intelligent diagnosis, and avoid hidden dangers of false negatives and false positives caused by subjective human diagnosis, thereby ensuring the accuracy of defect diagnosis.

The self-adaptive floating type coupled device provided in the present disclosure is a "force-distance" self-adaptive floating type coupled device. The self-adaptive floating type coupled device is bonded to the lining measured surface by using the telescopic elastic wheel, and the bonding force is obtained by using the force transducer built in the telescopic elastic wheel, and the distance from the measured surface is obtained by using the laser ranging sensor array on the self-adaptive floating type coupled device; the degree of bonding between the self-adaptive floating type coupled device and the measured surface is adjusted based on the bonding force and the distance between the self-adaptive floating type coupled device and the measured surface, so that not only it can be ensured that the self-adaptive floating type coupled device can be bonded to the measured surface all the time, but also it can be ensured that the self-adaptive floating type coupled device is not damaged due to unevenness of the measured surface.

The "multi-eye" gimbal provided in the present disclosure includes the plurality of defect inspection modules, and visible light camera and infrared camera directions are corrected by using the laser ranging module therein as the center and using the distance measured by the laser ranging module from the measured surface as reference, to ensure that imaging is performed on the same target region, thereby facilitating subsequent comprehensive judgment.

The linear array binocular imaging system provided in the present disclosure can determine pixel coordinates of a defect matching point through image calibration, and estimate the size of a defect according to relative coordinates between matching pints, thereby improving the examining efficiency.

The ground penetrating radar inspection data-based target recognition method provided in the present disclosure can implement real-time inspection for an abnormal target in a ground penetrating radar inspection process.

BRIEF DESCRIPTION OF THE DRAWINGS

The accompanying drawings constituting a part of the present disclosure are used to provide further understanding of the present disclosure. Exemplary embodiments of the present disclosure and descriptions thereof are used to explain the present disclosure, and do not constitute an improper limitation to the present disclosure.

FIG. 5(*a*) shows Embodiment 1 of a crack defect reason according to the present disclosure.

FIG. 5(*b*) shows a recognition result of Embodiment 1 of a crack defect reason according to the present disclosure.

FIG. 5(*c*) shows Embodiment 2 of a crack defect reason according to the present disclosure.

FIG. 5(*d*) shows a recognition result of Embodiment 2 of a crack defect reason according to the present disclosure.

FIG. 5(*e*) shows Embodiment 1 of a peeling-off defect reason according to the present disclosure.

FIG. 5(*f*) shows a recognition result of Embodiment 1 of a peeling-off defect reason according to the present disclosure.

FIG. 5(*g*) shows Embodiment 2 of a peeling-off defect reason according to the present disclosure.

FIG. 5(*h*) shows a recognition result of Embodiment 2 of a peeling-off defect reason according to the present disclosure.

FIG. 5(*i*) shows Embodiment 1 of a peeling-off and crack multi-defect reason according to the present disclosure.

FIG. 5(*j*) shows a recognition result of Embodiment 1 of a peeling-off and crack multi-defect reason according to the present disclosure.

FIG. 5(*k*) shows Embodiment 2 of a peeling-off and crack multi-defect reason according to the present disclosure.

FIG. 5(*l*) shows a recognition result of Embodiment 2 of a peeling-off and crack multi-defect reason according to the present disclosure.

FIG. 19(*a*) to FIG. 19(*c*) respectively show ground penetrating radar inspection data, an actual tag drawing, and a target inspection result according to an embodiment of the present invention.

FIG. 20(*a*) to FIG. 20(*c*) respectively show ground penetrating radar inspection data, an actual tag drawing, and a target inspection result according to another embodiment of the present invention.

FIG. 21(*a*) to FIG. 21(*c*) respectively show ground penetrating radar inspection data, an actual tag drawing, and a target inspection result according to another embodiment of the present invention.

Figure 1:
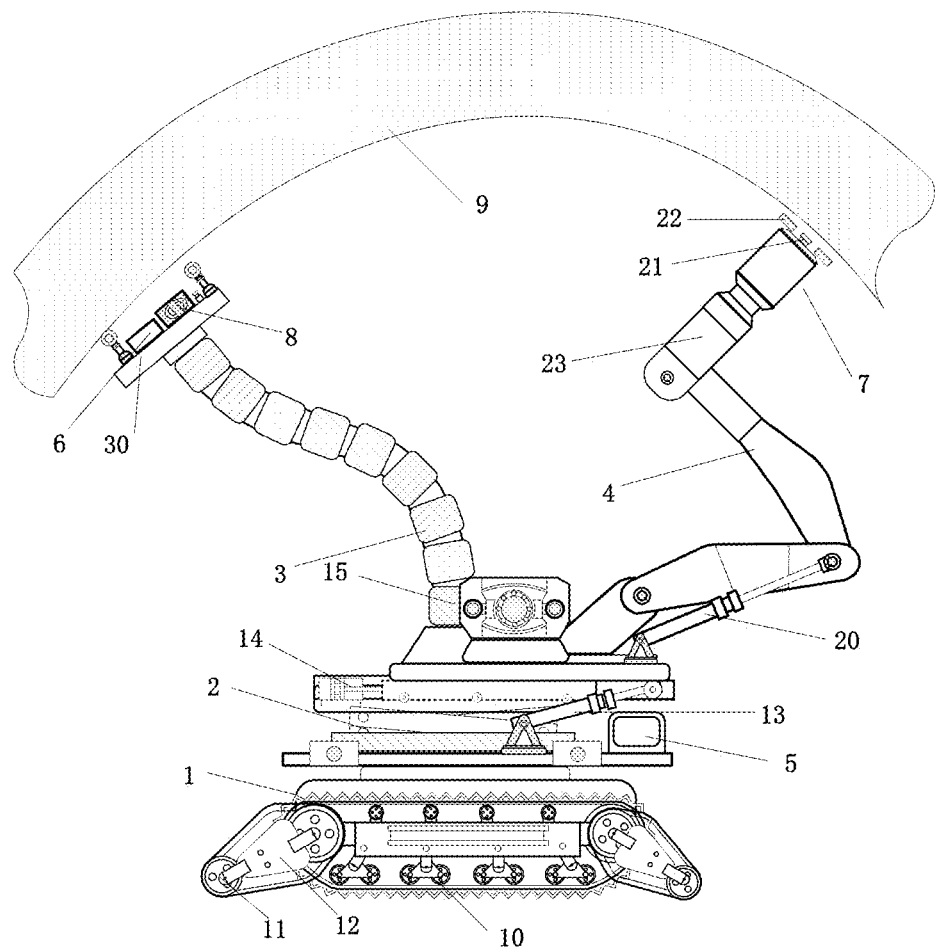
FIG. 1 is a schematic diagram of a multi-scale inspection and intelligent diagnosis system for tunnel structural defects according to an embodiment of the present disclosure.

1. Robot platform; 2. Rotatable telescopic platform; 3. Multi-joint snake-shaped mechanical arm; 4. Load measuring arm with a built-in inspection device; 5. Control section; 6. Ultrasonic imaging device; 7. X-ray backscattering device; 8. Ground penetrating radar; 9. Tunnel surface; 10. Track; 11. Telescopic rail wheel; 12. Linkage mechanism; 13. Hydraulic rod; 14. Stepmotor; 15. Laser 3D scanner; 16. Laser pulse source; 17. Ultrasound phased array; 18. Ranging sensor; 19. Elastic wheel; 20. Hydraulic mechanism; 21. X-ray source and radiation barrier; 22. Foldable single-photon detector array; 23. Precise attitude control unit; 24. Autonomous advancing control subsystem; 25. Multi-protocol communication subsystem; 26. Mechanical arm control subsystem; 27. Inspection control subsystem; 28. Power supply and charging system; 29. Processor module; 30. Floating carrying device; 31. Foldable arched push-open device; 32. Self-adaptive floating type coupled device; 33. Obstacle avoidance monitoring device; 34. Controller; 32-1. Hinge; 32-2. Reducer; 32-3. Laser ranging sensor; 32-4. Position sensor; 32-5. Torque sensor; 32-6. Supporting rod; 32-1. Housing; 32-2. Nondestructive inspection device fixing platform; 32-3. Laser ranging sensor array; 32-4: Obstacle avoidance monitoring device; 32-5. Telescopic elastic wheel; 32-6. Force transducer.

DETAILED DESCRIPTION

The present disclosure is further described below with reference to the accompanying drawings and embodiments.

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should further be understood that the terms "comprise" and/or "include" used in this specification indicate that there are features, steps, operations, devices, components, and/or combinations thereof.

In the present disclosure, orientation or position relationships indicated by the terms such as "upper", "lower", "left", "right" "front", "rear", "vertical", "horizontal", "side", and "bottom" are based on orientation or position relationships shown in the accompanying drawings, and are merely relationship words that are determined for ease of describing the structural relationship between components or elements in the present disclosure, and are not intended to specifically refer to any component or element in the present disclosure. Therefore, such terms should not be construed as a limitation on the present disclosure.

In the present disclosure, terms such as "fixedly connected", "interconnection", and "connection" should be understood in a broad sense. The connection may be a fixing connection, an integral connection or a detachable connection; or the connection may be a direct connection, or an indirect connection by using an intermediary. Relevant scientific research or technical personnel in the art may determine the specific meanings of the foregoing terms in the present disclosure according to specific situations, and such terms should not be construed as a limitation on the present disclosure.

A multi-scale inspection and intelligent diagnosis system for tunnel structural defects according to this embodiment includes a traveling section, a supporting section, an inspection section, and a control section.

During specific implementation, as shown in FIG. 1, the traveling section includes a robot platform 1, and tracks 10 are disposed on two sides of the robot platform 1. The tracks are used for advancing in a highway tunnel.

In another optional implementation, several telescopic rail wheels 11 are further symmetrically disposed on a bottom of the robot platform 1, and the telescopic rail wheels 11 perform joint telescopic movement by using a linkage mechanism 12, to implement operation in tunnels with different hole diameters.

It should be noted that, the linkage mechanism in this embodiment includes a chain, a gear, or a connecting rod. The linkage mechanism may also be implemented by a person skilled in the art by using another existing linkage structure.

Specifically, the tracks and the rail wheels separately drive the robot platform to move under driving of a corresponding driving mechanism under control of the control section.

During specific implementation, the supporting section is disposed on the traveling section, the supporting section includes a rotatable telescopic platform, and two mechanical arms working in parallel are disposed on the rotatable telescopic platform.

Specifically, one of the two mechanical arms is a multi-joint snake-shaped mechanical arm 3, and the other is a load measuring arm 4 with a built-in inspection device.

The multi-joint snake-shaped mechanical arm 3 and the load measuring arm 4 with a built-in inspection device are connected to the robot platform 1 by using the rotatable telescopic platform 2. The top of the rotatable telescopic platform 2 is controlled by using a hydraulic rod 13 to vertically ascend and descend, and the platform is controlled by using a stepmotor 14 to horizontally extend out, and the multi-joint snake-shaped mechanical arm 3 and the load measuring arm 4 with a built-in inspection device are disposed on the top of the rotatable telescopic platform 2. The hydraulic rod 13 and the stepmotor 14 are both connected to the control section.

In an implementation, the load measuring arm with a built-in inspection device includes a rear arm, an intermediate arm, and a front arm. The rear arm is connected to the rotatable telescopic platform 2, joint points of the rear arm and the intermediate arm are connected to a hydraulic mechanism 20, and the hydraulic mechanism is configured to assist in improving loading capacity of the load measuring arm with a built-in inspection device.

During specific implementation, the inspection section is mounted on the supporting section, and is configured to perform multi-scale inspection on surface defects and internal defects in different depth ranges of a same position of a tunnel structure, and transmit inspected defect information to the control section.

Specifically, the inspection section includes but not limited to a laser 3D scanner 15, a ground penetrating radar 8, an ultrasonic imaging device 6, and an X-ray backscattering device 7.

The laser 3D scanner 15 is mounted on the rotatable telescopic platform 2, and is configured to acquire tunnel panorama image information including defects of cracks and water leakage on a tunnel lining surface.

The ground penetrating radar 8 and the ultrasonic imaging device 6 are disposed on a top end of the multi-joint snake-shaped mechanical arm. The ground penetrating radar 8 may be a GHz/THz wide frequency band ground penetrating radar, configured to obtain deeper lining defects.

Figure 2:
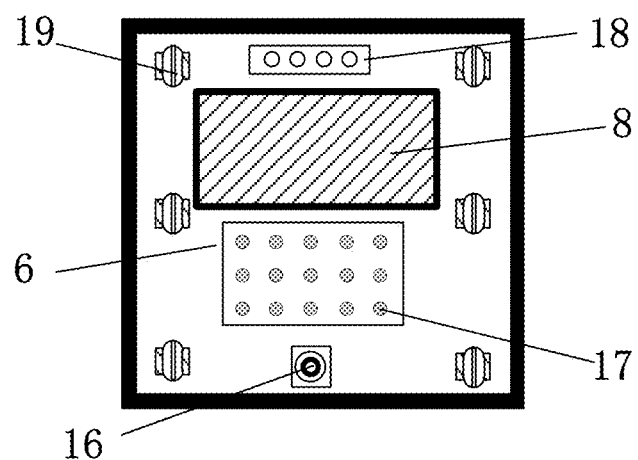
FIG. 2 is a schematic diagram of an ultrasonic imaging device according to an embodiment of the present disclosure.

The ultrasonic imaging device 6 is configured to obtain depths and widths of the cracks on the tunnel lining surface. As shown in FIG. 2, two types of laser sources, namely, a laser pulse source 16 and an ultrasound phased array 17 are disposed on the ultrasonic imaging device 6. For a relatively smooth region on the tunnel inner wall surface (such as the top of the highway tunnel, the subway tunnel, or the like), the laser ultrasonic technology is used, a non-contact laser pulse source is used to generate elastic waves, and the ultrasound phased excitation is used on two sides of the highway tunnel provided with a flame retardant material on the surface.

The ground penetrating radar 8 and the ultrasonic imaging device 6 are embedded in a floating carrying device 30, which includes a ranging sensor 18 and an elastic wheel 19. A distance between a phased array and a tunnel surface is precisely controlled by using the ranging sensor 18. The elastic wheel 19 is provided with a torque sensor, capable of controlling the degree of bonding between ultrasound and ground penetrating radar and the measured structural surface.

The X-ray backscattering device 7 is built in the load measuring arm 4 with a built-in inspection device, and is configured to perform millimeter-level measurement on the inside of cracks of a tunnel lining surface. A power supply and water cooling system of the X-ray backscattering device 7 is built in the intermediate arm, to reduce load on the front arm on the top end. An x-ray source and radiation barrier 21 is built in the cylindrical front arm on the top end. A foldable single-photon detector array 22 is annularly disposed on top of the front arm. A precise attitude control unit 23 is separately disposed on the front arm, to control the measuring arm to complete multi-angle fine actions such as telescopic movement and rotation.

Figure 3:
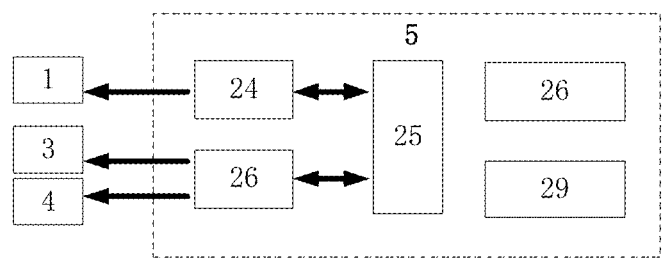
FIG. 3 is a structural block diagram of a control section and shows a relationship between parts according to an embodiment of the present disclosure.

During specific implementation, as shown in FIG. 3, the control section 5 includes: an autonomous advancing control subsystem 24, a multi-protocol communication subsystem 25, a mechanical arm control subsystem 26, an inspection control subsystem 27, a power supply and charging system 28, and a deep learning super processor module 29. Deep learning algorithms such as Deeplab, GAN, and Faster R-CNN are built in the deep learning super processor module 29. The algorithms first train surface and internal defect image data such as a surface defect image, a ground penetrating radar B-Scan image, an X-ray backscattering image, and an ultrasonic image, to establish a defect diagnosis model.

Specifically, the control section is configured to:
construct a deep neural network-based defect diagnosis model;
construct a data set by using historical surface defect and internal defect information and a marked pixel-level defect type, and train the deep neural network-based defect diagnosis model; and
receive defect information in real time and input the received defect information into a trained defect automatic recognition and diagnosis model, and automatically recognize a type, a position, and a contour of a defect.

Using surface defect recognition as an example, the surface defects mainly include defects of cracks, peeling-off, and water seepage on the tunnel lining surface. The Deeplab deep learning network is used for surface defect recognition. The feature of the Deeplab network is use of a hollow convolution structure, which can fully extract high-level features in the feature encoding process while keeping good position information without loss, and improving the precision of defect recognition without an increase of the amount of calculation. The specific steps are as follows: First, preprocessing is performed on an acquired surface defect picture, mainly including picture cropping and data augmentation. Then pixel-level marking is performed on an image, a type of a defect at each pixel is marked, and a training set is distinguished from a validation set. A manufactured tag and a corresponding original drawing are input into the Deeplab network for training, and after a plurality of rounds of convergence by an iterative network model, a defect recognition model is obtained. Finally, a ground penetrating radar image acquired in real time is input as a test set to the trained Deeplab network model. The network output image removes other non-defect information in the original image, and keeps only contours of different types of defects such as cracks, peeling-off, and water leakage in the original drawing, to implement automatic recognition of defect types and contours.

The control section is further configured to:
position and frame a tunnel environment, and perform path planning on the traveling section.

Based on technologies such as laser SLAM and visual SLAM, the tunnel environment with uneven illumination is positioned and framed, and path planning is performed by using a deep learning panoramic segmentation algorithm plan built in the super processor module.

A working method of the multi-scale inspection and intelligent diagnosis system for tunnel structural defects of this embodiment includes:

The laser 3D scanner may simultaneously obtain three-dimensional laser point cloud information and image information at positions corresponding thereto, and may provide reliable data for both the laser SLAM technology and visual SLAM technology. There are two main objectives for using the laser SLAM technology and visual SLAM technology in this example. One is for robot advancing path planning, for controlling the robot platform to travel in the tunnel. The other is for path planning for mechanical arm inspection, for positioning a key inspection region, and controlling the mechanical arm to move to the key inspection region for inspection.

For the first objective, the laser SLAM technology is mainly used, and the laser SLAM technology is more stable in consideration of environments such as illumination in the tunnel. The specific process is as follows: The tunnel environment is scanned by using the laser 3D scanner, to obtain point cloud information; a position of the robot platform in the tunnel, namely, the number of kilometers of the position, the size from the tunnel side wall, or the like, is determined through matching and comparison between two pieces of point cloud at different moments, to position the robot itself; the robot platform performs movement; coordinates of the moving robot platform, a tunnel bottom plate, a tunnel side wall, a tunnel vault, and various obstacles in a grid map are determined by using a grid map representation method, to construct the grid map; and finally, an advancing path of the robot platform is planned by using algorithms such as a dynamic window approach (DWA).

For the second objective, inspection path planning needs to be jointly completed through collaboration of laser SLAM and visual SLAM. The basic principle is: a specific key region position is determined by using the visual SLAM technology, a tunnel surface defect is framed by using a conventional framing algorithm such as an ORB-dark blue algorithm based on an acquired surface image, and through defect recognition algorithm analysis such as deep learning, the type, contour, and position of the defect are determined, to further draw a key region. At this time, the laser SLAM technology is used as an aid to determine the position of the obstacle, and then control the action of the mechanical arm to inspect the key positions with more cracks and leakage.

The traveling section moves in the tunnel at a specific speed.

The inspection section on the supporting section performs multi-scale inspection on surface defects and internal defects in different depth ranges of a same position of a tunnel structure, and transmits inspected defect information to the control section.

The control section constructs a deep neural network-based defect diagnosis model, constructs a data set by using historical surface defect and internal defect information and a marked pixel-level defect type, and train the deep neural network-based defect diagnosis model; and receives defect information in real time and inputs the received defect information into a trained defect automatic recognition and diagnosis model, and automatically recognizes a type, a position, and a contour of a defect.

After inspection in one key region is completed, the system automatically moves to a next key inspection region for monitoring.

The method further includes:
storing, by the control section, the defect information received in real time and the automatically recognized defect type into a historical database; training the defect diagnosis model again by using data in the historical database, to obtain an updated defect diagnosis model; and performing defect diagnosis by using the updated defect diagnosis model. Diagnosis results are shown in FIG. 5(*a*) to FIG. 5 (*l*).

Figure 4:
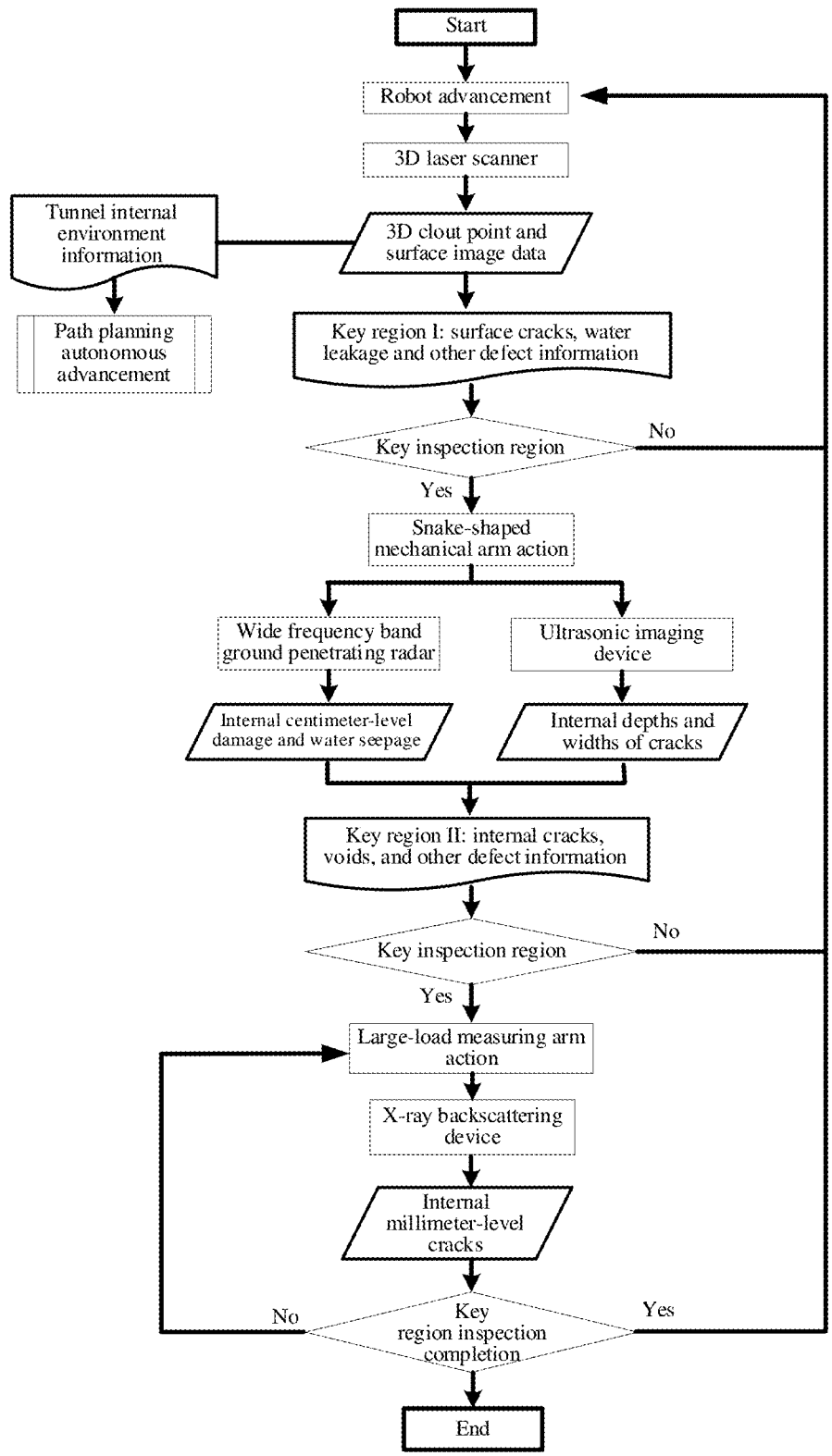
FIG. 4 is a flowchart of defect inspection according to an embodiment of the present disclosure.

Specifically, as shown in FIG. 4, a working flow of the multi-scale inspection and intelligent diagnosis system for tunnel structural defects of this embodiment is as follows:
the traveling section moves in the tunnel at a specific speed;

the inspection section on the supporting section performs multi-scale inspection on surface defects and internal defects in different depth ranges of a same position of a tunnel structure, and transmits inspected defect information to the control section.

Crack and leakage information on the tunnel structural surface is extracted from the acquired internal environment panoramic information, a plurality of defects such as internal and surface cracks and water leakage are diagnosed based on a pixel prediction algorithm such as Deeplab, and surface crack and water leakage dense regions are marked as key inspection regions, to preliminarily plan an inspection region.

A snake-shaped mechanical arm controller sends a command to control the snake-shaped mechanical arm to drive action of the ground penetrating radar. Defects such as internal voids of a tunnel lining structure are inspected by using a wideband ground penetrating radar, internal defect regions are quickly marked by using a deep learning target inspection algorithm, defects are recognized by using a ground penetrating radar intelligent recognition algorithm, and at the same time, focused inspection is performed by using the laser ultrasonic imaging device, to obtain depths and widths of the cracks.

Regions without defects or with fewer defects are ignored, and only regions in which the ground penetrating radar and ultrasonic imaging device inspects a relatively large number of cracks and voids are used as key regions again. A large-load mechanical measuring arm is controlled to act, and fine measurement is performed on millimeter-level cracks in the region structure by using the X-ray backscattering device.

After inspection in one key region is completed, the system automatically moves to a next key inspection region for monitoring.

During specific implementation, B-SCAN images acquired by a ground penetrating radar are processed based on the deep learning algorithm, to simultaneously classify and quickly position a plurality of defects such as position internal voids, cracks, and leakiness of the tunnel. The defects are recognized by using a deep target inspection algorithm and a ground penetrating radar intelligent recognition algorithm.

Embodiment 2

Based on Embodiment 1, this embodiment provides a telescopic mechanical arm, used on a robot platform.

Figure 6:
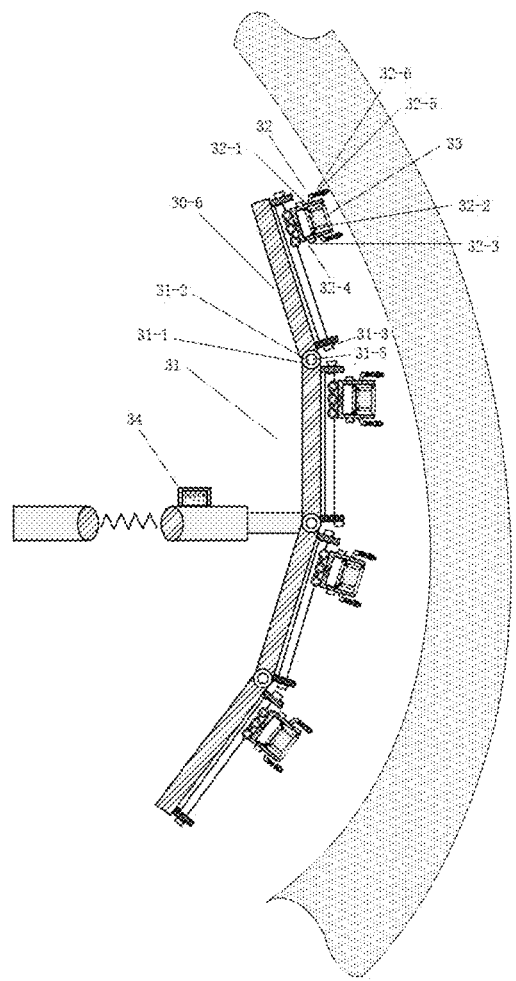
FIG. 6 is a schematic structural diagram of an overall connection between a mechanical arm, a foldable arched push-open device, and a self-adaptive floating type coupled device according to an embodiment of the present disclosure.

The mechanical arm is a telescopic mechanical arm. As shown in FIG. 6, an end of a working end of the mechanical arm, namely, an end of an extension arm, is connected to a self-adaptive floating type coupled device by using a foldable arched push-open device 2. Specifically, the mechanical arm is an industrial mechanical arm. An extension arm of the mechanical arm is configured to move the self-adaptive floating type coupled device to a position near a lining surface.

The foldable arched push-open device 31 includes a plurality of (four in this embodiment) supporting frames connected to each other, and two adjacent supporting frames are connected through rotation of a rotary shaft, and the rotary shaft is driven by a reducer; and a torque sensor is disposed on a transmission output shaft of the reducer. A hinge is further disposed on an outer layer of a joint between two adjacent supporting rods, and is configured to limit a rotation angle to be within a range of 0° to 120°. Each supporting frame is provided with an electric guide rail in a direction consistent with the supporting frame, a pulley is disposed on each electric guide rail, and the self-adaptive floating type coupled device 32 is fixed to each pulley by using a flange, and is capable of moving along the electric guide rail.

A position sensor 31-4 is mounted on the pulley of the electric guide rail, and is configured to sense a position of the self-adaptive floating type coupled device on the electric guide rail. The movement of the self-adaptive floating type coupled device on the guide rail enables the self-adaptive floating type coupled device to reach a specified measurement point or measurement line, and avoid obstacles.

A laser ranging sensor 31-3 is disposed on either end of each electric guide rail, and is configured to sense a distance between either end of the guide rail and a measured surface.

Figure 7:
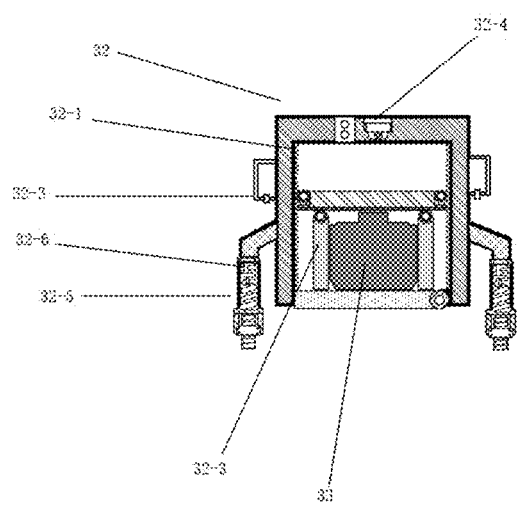
FIG. 7 is a schematic structural diagram of a self-adaptive floating type coupled device for nondestructive inspection in a tunnel lining according to an embodiment of the present disclosure.

As shown in FIG. 7, the self-adaptive floating type coupled device 32 includes: a housing 32-1, where one or more telescopic elastic wheels 32-5 are provided on an outer surface of the housing 32-1, and are all configured to bond to a measured surface of a tunnel lining, and a force transducer 32-6 is built in each telescopic elastic wheel 32-5 for sensing a bonding force between the self-adaptive floating type coupled device and the measured surface; specifically, the telescopic elastic wheel 32-5 includes a rod member connected to the outer surface of the housing 32-1, an end of the rod member is connected to an end of the force transducer 32-6, and the other end of the force transducer 32-6 is connected to an end of a spring, both the force transducer and the spring are accommodated in a columnar accommodating cavity, an end of the columnar accommodating cavity away from the rod member is blocked, and the other end is provided with an opening, and a size of the opening enables the columnar accommodating cavity to be sleeved outside the rod member, and an outer side of the blocked end of the columnar accommodating cavity is connected to a walking wheel by using a bracket. During defect inspection, the walking wheel closely bonds to the measured surface, and pressure is delivered to the force transducer by using the spring, so that the bonding force between the self-adaptive floating type coupled device and the measured surface is measured.

A laser ranging sensor array 32-3 is also disposed on the outer surface of the housing 32-1, and is configured to monitor a distance between the self-adaptive floating type coupled device and the measured surface.

Both the force transducer 32-6 and the laser ranging sensor array 32-3 are connected to a controller. In a device running process, information about the bonding force and distance between the self-adaptive floating type coupled device and the measured surface is transmitted in real time to the controller, and the controller adjusts a relative distance between the self-adaptive floating type coupled device and the measured surface according to the information about the bonding force and the distance, to ensure the safety of the device in a precondition that the self-adaptive floating type coupled device is always kept bonded to the measured surface.

In an implementation, the housing is in the shape of a cube. Each self-adaptive floating type coupled device is provided with four telescopic elastic wheels 32-5, respectively located at four bottom angles of a bottom surface of the self-adaptive floating type coupled device. A spring force transducer is built in a telescopic elastic wheel to feed back a bonding force in the entire bonding process. The four wheels are Mecanum wheels that enable the "force-distance" self-adaptive floating type coupled device to slide in a movement process in contact with the tunnel lining surface, to ensure the continuity of the inspection device in the inspection process.

Figure 9:
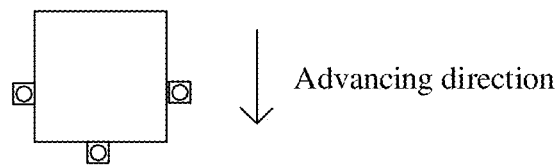
FIG. 9 is a schematic diagram of layout in which a laser ranging sensor array is on a side wall of an outer surface of a self-adaptive floating type coupled device according to an embodiment of the present disclosure.

As shown in FIG. 9, a laser ranging sensor array 32-2 is mounted on a side surface of each self-adaptive floating type coupled device, and a triangular or rhombic layout manner may be used. In the triangular layout manner, laser ranging sensor arrays 32-2 are mounted on a side surface of an advancing direction and two side surfaces on the left and right of the advancing direction. In the rhombic layout manner, laser ranging sensor arrays 32-2 are mounted on all four side surfaces of the self-adaptive floating type coupled device. Whether a small region is flat can be determined by disposing a plurality of laser ranging sensors. In a completed step, first, when the laser sensor in the advancing direction inspects a distance change, then it is determined whether the intermediate laser sensor inspects a distance change, so that whether a point is uneven or a region is uneven can be determined.

When the mechanical arm lifts the "force-distance" self-adaptive floating type coupled device to reach a position of a measurement point on the tunnel lining surface, the distance between the "force-distance" self-adaptive floating type coupled device and the lining surface can be adjusted in real time according to signals fed back by the laser sensor and the spring force transducer in collaboration with the mechanical arm, to ensure the inspection precision of the inspection device.

An obstacle avoidance monitoring device 32-4 is further provided on the outer surface of the housing 32-1 facing toward the advancing direction, is composed of a laser radar and a surveillance camera, and is configured to monitor front lining surface information in a running process.

The laser radar and the surveillance camera transmit the front lining surface information obtained in the running process to the controller, and the controller then recognizes a front obstacle by using recognition algorithms such as Fast-RCNN or Faster-RCNN, and generates an early-warning obstacle avoiding action in collaboration with controlling attitudes of the mechanical arm and the self-adaptive floating type coupled device.

A nondestructive inspection device fixing platform 32-2 is further disposed in the housing for fixing the nondestructive inspection device 33, configured to inspect internal defects of the tunnel lining structure. Clamping slots configured to fix nondestructive inspection devices such as an ultrasonic detector, a ground penetrating radar or a terahertz inspection device probe are reserved on the nondestructive inspection device fixing platform 32-2. To fix the nondestructive inspection device more securely, and improve the inspection stability and precision, a rack is disposed on each of two opposite side surfaces in the housing; the nondestructive inspection device fixing platform includes a horizontal guide rail and two vertical guide rails vertically connected to the horizontal guide rail; gears are respectively disposed on two ends of the horizontal guide rail, and are respectively engaged with the two racks; a rack is disposed on a side for fixing the nondestructive inspection device of the horizontal guide rail, and the two vertical guide rails are engaged with the rack on the horizontal guide rail by using gears. The foregoing gears are all connected to a driving motor, and the driving motor is connected to the controller. By controlling the relative position of the horizontal guide rail in the housing and the distance between the vertical guide rails, nondestructive inspection devices of different sizes and different shapes can be fixed in the self-adaptive floating type coupled device. The clamping slot for fixing the nondestructive inspection device is provided on the horizontal guide rail.

A transparent cover body is disposed on a bottom surface of the housing, namely, a surface facing toward a measured device. Materials such as acrylic plates, polylactide plates, and polystyrene plates may be used, and the materials have no impact on signals in the ground penetrating radar wave inspection direction.

The other parts of the housing, the foldable arched push-open device, and the extension arm are made of lightweight materials such as carbon fibers and nanofibers. The foregoing materials can greatly reduce the weight of the device itself, and can carry heavier nondestructive inspection devices, to achieve the stability of the inspection device in the moving inspection process.

The reducer, the torque sensor, the laser ranging sensors, and the position sensor are all connected to the controller, so that a distance from the surface of the measured region and the angle information of the arched unfolded guide rail and the information about the distance between the two ends of each guide rail and the measured surface can be measured in real time. The controller adjusts the rotation angle of each rotary shaft in real time by using the reducer according to the rotation angle between the guide rails and the distance from the measured surface that are fed back, so that the unfolded arched push-open device can fit the lining surface of different radians.

Figure 8:
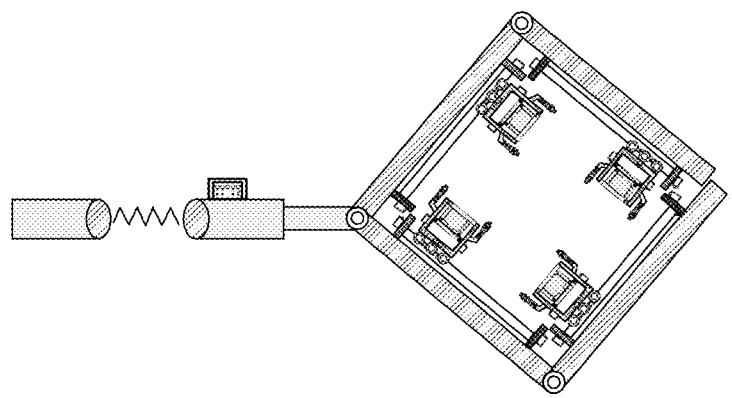
FIG. 8 is a schematic diagram of a foldable arched push-open device after folding according to an embodiment of the present disclosure.

The structure of the foldable arched push-open device 31 not only realizes the adaptability to the lining surface of different radians in the process of tunnel lining defect inspection, but also facilitates storage in a non-operating state, as shown in FIG. 8.

The mechanical arm and the controller are both mounted on a moving platform of a defect inspection robot for implementing linkage control of a plurality devices, namely, the multi-shaft mechanical arm device, the foldable arched push-open device 31, and the self-adaptive floating type coupled device 32 and the obstacle avoidance monitoring device 33 that carry inspection devices, to ensure precise bonding between the inspection device and a tunnel lining inner wall and quick movement.

Figure 10:
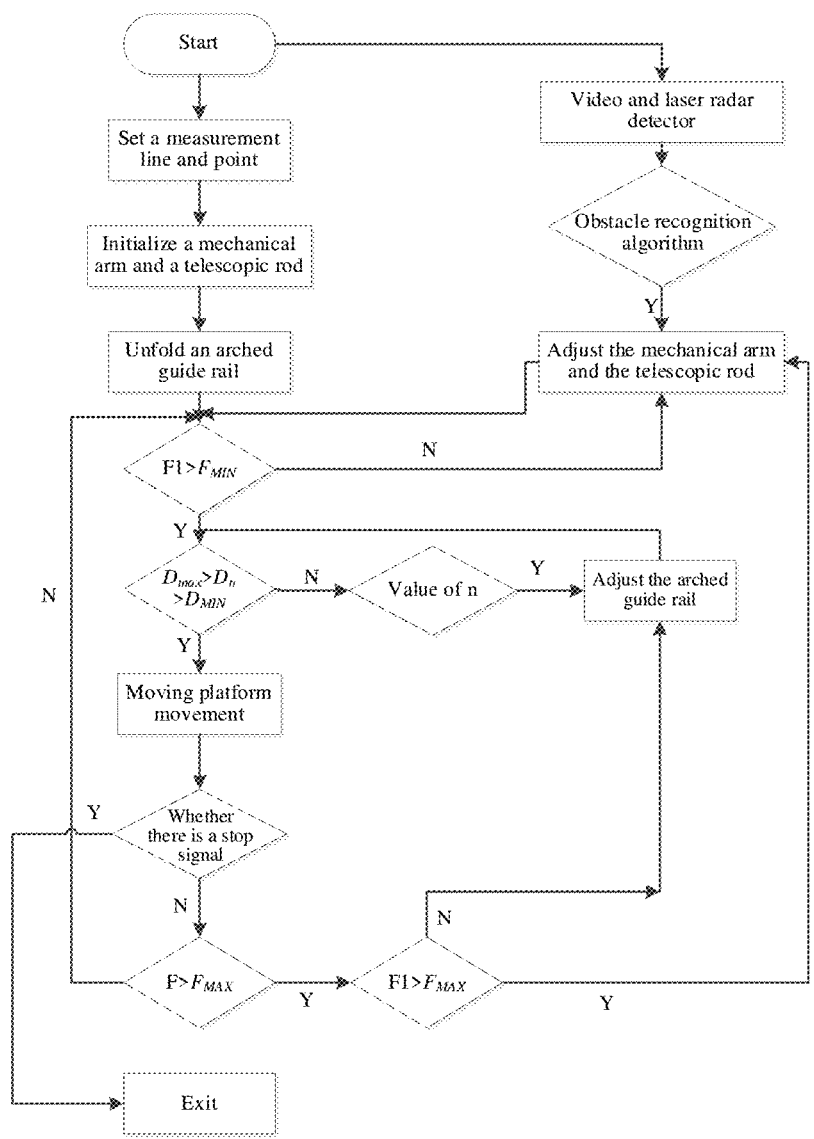
FIG. 10 is a schematic flowchart of a method for controlling a self-adaptive floating type coupled device according to an embodiment of the present disclosure.

As shown in FIG. 10, after the defect inspection robot is started, the mechanical arm is first initialized, the foldable arched push-open device is unfolded and sent to a position near the measured surface; the controller receives, in real time, sensing information sent by the ranging sensor and the force transducer on the self-adaptive floating type coupled device, the front measured surface information sent by the obstacle avoidance monitoring device, the sensing information sent by the ranging sensor on the foldable arched push-open device, and the like; in collaboration with controlling the adjustment of the mechanical arm and the foldable arched push-open device, the specific control process is as follows:

(1) it is determined whether a contact force of the electric guide rail at the highest position after the foldable arched push-open device is unfolded is greater than a minimum contact force, if not, the mechanical arm is adjusted to make the self-adaptive floating type coupled device on the guide rail to be more closely bonded to the measured surface; if yes, step (2) is entered; in this embodiment, the electric guide rail at the highest position is the second rail from bottom to top;

(2) it is determined whether the distance between an end portion of each guide rail and the lining surface is within a specified range, if not, the number of the guide rail whose distance is not within the specified range is obtained, and the foldable arched push-open device is adjusted, to enable the distance between the end portion of the guide rail and the measured surface to be within the specified range; if yes, initialization ends, the defect inspection robot moves for surface defect inspection, and step (3) is entered;

(3) during the movement, it is determined whether there is a stop signal, the stop signal includes a defect inspection end signal; if yes, the defect inspection robot is controlled to stop running; if not, it is determined whether there is a contact force between the guide rail and the measured surface greater than a specified maximum contact force; if yes, a re-initialization stop signal is generated to control the defect inspection robot to stop moving, and step (4) is entered; and (4) it is determined whether the contact force of the electric guide rail at the highest position is greater than the specified maximum contact force, if yes, the mechanical arm is adjusted to loosen the bonding between the self-adaptive floating type coupled device on the electric guide rail at the highest position and the measured surface; and if not, the foldable arched push-open device is adjusted for returning to step (2).

During the movement, the distance data transmitted by the laser ranging sensor of the self-adaptive floating type coupled device is always determined; a rule for determining the distance between the self-adaptive floating type coupled device on any guide rail and the lining surface is as follows: It is first determined in the advancing direction whether the distance of the first laser ranging sensor is within a specified range, if yes, movement continues to be performed; if not, it is determined whether distances measured by the second and third laser ranging sensors are within the specified range, if yes, the distance of the self-adaptive floating type coupled device is not changed, and if not, movement is stopped to perform a bonding operation again.

During movement of the moving platform, whether there is an obstacle ahead is determined according to front measured surface information sent by the obstacle avoidance monitoring device; when there is an obstacle, one or more obstacle avoiding manners are selected according to the size, the shape, and the position of the obstacle. The obstacle avoiding manners include: adjusting a position of the self-adaptive floating type coupled device on the electric guide rail, adjusting rotation angles between supporting rods of the foldable arched push-open device, and adjusting a telescopic length of the mechanical arm. For example, if the obstacle is very small, obstacle avoidance can be implemented by adjusting the position of the self-adaptive floating type coupled device on the electric guide rail.

The self-adaptive floating type coupled device provided in this embodiment is a "force-distance" self-adaptive floating type coupled device. The self-adaptive floating type coupled device is bonded to the lining measured surface by using the telescopic elastic wheel, and the bonding force is obtained by using the force transducer built in the telescopic elastic wheel, and the distance from the measured surface is obtained by using the laser ranging sensor array on the self-adaptive floating type coupled device; the degree of bonding between the self-adaptive floating type coupled device and the measured surface is adjusted based on the bonding force and the distance between the self-adaptive floating type coupled device and the measured surface, so that not only it can be ensured that the self-adaptive floating type coupled device can be bonded to the measured surface all the time, but also it can be ensured that the self-adaptive floating type coupled device is not damaged due to unevenness of the measured surface.

In addition, on the self-adaptive floating type coupled device, the laser ranging sensor arrays are arranged on a plurality of side surfaces of the self-adaptive floating type coupled device, to ensure monitoring of an entire bonding surface between the self-adaptive floating type coupled device and the measured surface, thereby ensuring the device safety.

The nondestructive inspection device fixing platform is disposed in the self-adaptive floating type coupled device of this embodiment, and clamping slots of probes of inspection devices such as an ultrasonic detector, a ground penetrating radar and a terahertz inspection device are reserved, so that nondestructive inspection devices can be mounted according to user requirements.

The self-adaptive floating type coupled device in this embodiment is disposed on the foldable arched push-open device formed by connection of a plurality of supporting rods; the distances between the plurality of supporting rods and the measured surface are monitored in real time by using the ranging sensors, and angles between the plurality of supporting rods are adjusted according to the distances, so that in the running process, the plurality of supporting rods of the foldable arched push-open device can adapt to tunnel lining surfaces with different radians.

Embodiment 3

Based on Embodiment 1, this embodiment provides a multifunctional gimbal, which may be disposed on a robot platform.

Figure 11:
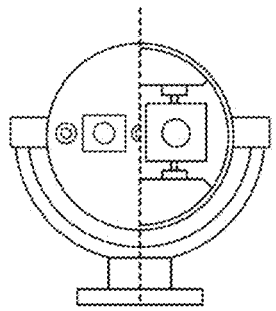
FIG. 11 is a schematic structural diagram of a multifunctional gimbal according to an embodiment of the present disclosure.

As shown in FIG. 11, the multifunctional gimbal is hemispherical, and is disposed above a vehicle body by using a bracket. In this embodiment, the bracket is U-shaped, and the hemispherical multifunctional gimbal is clamped in the U-shaped bracket. Specifically, two sides of the multifunctional gimbal are separately connected to the bracket by using a lateral-roll motor, so that the gimbal can perform pitch movement. The bracket is connected above the vehicle body by using a vertical-roll motor, so that the gimbal can perform rotation in a horizontal direction.

To sense in real time and accurately control movement of the gimbal, a plurality of sensors including a three-axis gyroscope and torque sensors are further disposed in this embodiment. The gyroscope is disposed on the bracket. The torque sensors are disposed on motors. The gyroscope and the torque sensors are respectively configured to obtain rotation acceleration and rotation angle information of the gimbal, and torque signals of the motors for transmission to a controller. The gyroscope and the torque sensors are all connected to the controller. The controller receives rotation direction, angular velocity, and rotation acceleration information sent by the gyroscope, and torque information sent by three torque sensors, and generates intervention signals for rotation of three driving motors by using a preset gimbal swing program based on image distortion feedback and motor torque feedback information obtained through image processing, and separately adjusts rotation speeds of the three driving motors in real time.

A plurality of inspection modules for defect inspection are disposed in the multifunctional gimbal, and are all connected to the controller. The plurality of inspection modules include: a three-dimensional modeling and deformation inspection module, a crack and peeling-off inspection module, a leakage inspection module, and a laser ranging module. The three-dimensional modeling and deformation inspection module is configured to model the tunnel surface lining for overall observation of the tunnel; the crack and peeling-off inspection module is mainly composed of a visible light camera, which is responsible for shooting an optical image of the tunnel surface lining, for inspecting naked-eye-visible cracks and peeling-off of the tunnel surface lining; the leakage inspection module is mainly composed of an infrared thermal imaging camera, which is responsible for shooting a possible low temperature region on the surface or shallow layer of the tunnel, for inspecting possible leakage inside the tunnel; the laser ranging module is mainly composed of a laser range finder, which is responsible for acquiring the "image-object" distance, providing a conversion relationship between image space and physical space, and providing support for a series of defect data analysis such as subsequent defect geometrical parameter assessment, sampling image specification calibration, and multi-defect data overlaying.

A shell of a supporting platform of the multifunctional gimbal is made of stainless steel or a plastic alloy and is hemispherical. Four holes are provided on a hemispherical section to accommodate a laser emitting unit of the three-dimensional modeling and deformation inspection module, the visible light camera of the crack and peeling-off inspection module, the infrared camera of the leakage inspection module, and a laser emitting unit of the laser ranging module, and the sizes of the four holes are all greater than the size of the laser emitting unit or camera separately accommodated therein, and provide space for rotation thereof, forming a "four-eye" device. The positional relationship between the visible light camera of the crack and peeling-off inspection module, the infrared camera of the leakage inspection module, and the laser emitting unit of the laser ranging module meets: the three are on the same horizontal line, and the laser emitting unit of the laser ranging module is located at the center, the visible light camera and the infrared camera are respectively located on two sides of the laser emitting unit, and are at the same distance from the laser emitting unit. In this embodiment, the infrared camera and the visible light camera are respectively placed on two sides of the laser range finder at a distance of 5 cm.

The three-dimensional modeling and deformation inspection module, the crack and peeling-off inspection module, the leakage inspection module, and the laser ranging module are all fixed in the multifunctional gimbal by using a supporting mechanism. The laser ranging module is disposed in the middle of the supporting mechanism. The crack and peeling-off inspection module and the leakage inspection module are respectively disposed on two sides of the laser range finder, and are disposed on the supporting mechanism by using steering motors. The two steering motors are respectively configured to control steering of the crack and peeling-off inspection module and the leakage inspection module, so that visual field centers of the visible light camera of the crack and peeling-off inspection module and the infrared camera of the leakage inspection module and the point position of laser emitting unit of the laser ranging module overlap in the defect inspection process, and the completely same tunnel lining surface is imaged. Due to the distance between the two inspection devices, when the camera shooting angle is not adjusted, although the infrared camera and the visible light camera point to the same direction, there are still some errors in the shot lining surface, resulting in a positional deviation during subsequent defect data fusion, and causing a defect level assessment error. Therefore, a small-angle steering motor is mounted below each inspection device, the controller sends a control signal to adjust the rotation angle of each steering motor in real time based on distance information of the range finder and feedback information of multi-image matching correction, and the inspection devices on left and right sides are respectively rotated to the middle by corresponding angles, and the specific value of the angle is calculated by an image processing unit of the controller based on the distance information fed back by the laser range finder. Generally, the values of rotation angles of the steering motors on two sides are the same and the directions are opposite, so that the center of the visible light image, the center of the infrared image and the laser ranging point position overlap. The position of three-dimensional modeling and deformation inspection module may be located above or below the laser range finder, and is not limited herein, and the position of the three-dimensional modeling and deformation inspection module is set to ensure stability of the gimbal.

The mounting positions of the four inspection modules are related to weights thereof, and the objective is to ensure the stability of the gimbal during rapid reciprocating swing. Weight information of each inspection module is pre-obtained, and through allocation by the supporting mechanism inside the supporting platform as well as retrofitting of limiting blocks on two sides of the inspection modules on the supporting mechanism, the gravity centers of the devices do not excessively offset during the swing, to ensure that rotation speeds of the driving motors are not affected by offsets of the gravity centers. The specific method for obtaining the gravity information is not limited herein. In this embodiment, offset information of the gravity centers of the inspection devices relative to rotary shafts of the three driving motors is determined according to initial gravity information of the inspection devices by obtaining torque information and rotation information, and the offset information is obtained through calculation by the controller, and gravity initialization is performed on the gimbal according to the offset information.

A mobile client and a controller of a comprehensive defect inspection device are connected by using a wireless communication module, a tunnel lining structural defect inspection result sent by the wireless communication module is received in real time, and a control signal is sent to the controller.

The mobile client is divided into a master client installed on a computer and a slave client installed on a mobile phone. All data from a tunnel inspection vehicle can be received by using an application installed on the computer, and an instantaneous control signal can be sent to the tunnel inspection vehicle at the same time, for human intervention of a possible special case. The slave client mounted on the mobile phone supports an Android platform and an iOS platform, and can receive inspection data and some key information from the tunnel inspection vehicle in real time.

A working method for tunnel lining structural defect comprehensive inspection includes the following working steps:

S1. Before the start of each inspection operation, the controller receives, by using the wireless communication module, a startup instruction sent by the mobile client, and controls the startup of the moving carrier, the gimbal, and the inspection modules, where the startup instruction includes a route of this defect inspection operation, a swing speed of the gimbal, and a moving speed of the moving carrier, and steps S2, S3, and S4 are synchronously performed.

S2. After the multifunctional gimbal receives the startup instruction, the gimbal is adjusted to face toward the direct right of the moving platform and start to perform a swing action at a constant speed along a cross section of the tunnel. Specifically, the swing speed may be determined according to visible light and infrared imaging quality. When the swing speed is excessively large, the image distortion degree is excessively large, and accurate judgment cannot be performed.

S3. After receiving the startup instruction, the smart moving carrier performs an advancing action according to a preset speed and route of the program.

S4. After receiving the startup instruction, the comprehensive inspection device automatically adjusts the inspection modules to ensure that different inspection modules shoot the same target region; the inspection modules and the laser ranging module are started at the same time, and perform the shooting action synchronously. During advancement of the moving carrier, with the swing of the multifunctional gimbal, the images of the same tunnel lining are taken simultaneously and synchronously. The laser ranging module records the distance information of the center point of the current image in real time, and transmits the comprehensive data to the controller separately and simultaneously for image processing.

S5. After receiving the comprehensive data sent by the compressive inspection device, an image and digital acquisition unit in the controller sends the compressive data to an image processor for processing and analysis of the compressive data, and then a result is sent to a large-capacity storage unit, and defect key information is sent to the mobile client by using a wireless signal transceiver at the same time.

S6. After the moving carrier reaches a preset end point, the controller sends a stop instruction and the device stops.

In step S2, when the gimbal enters the official working state, the vertical-roll motor rotates the orientation of the multifunctional gimbal to the direct right of the vehicle body, and the two lateral-roll motors drive the clamped spherical machine to perform rapid reciprocating swing actions, and drive the hemispherical supporting platform to perform corresponding actions. Generally, the swing angular velocity is greater than 180°/second. The rotation speeds of the driving motors are transmitted back in real time, and the controller dynamically adjusts the rotation speed of the gimbal based on multi-information.

In step S4, the controller receives, in real time, the information that is about the distance from the current measured surface and that is sent by the laser ranging module, and calculates, according to the distances between the infrared camera and the visible light camera and the laser distance module, and the distance between the laser emitting module and the measured surface, angles by which the infrared camera and the visible light camera need to deflect, so that the left and right cameras shoot the completely same region.

In this embodiment, because the infrared camera and the visible light camera are each at a distance of approximately 5 centimeters from the laser range finder, for example, distance information fed back by the laser range finger is D (unit, m), so that a rotation angle of a small-range rotation motor is approximately equal to $$\arctan\frac{0.05}{D}.$$

Generally, the rotation angle of the small-angle rotation motor is less than 2 degrees, so that the left and right cameras shoot the completely same region. The rotation of the angle will cause distortion of the captured image. The distorted image can be calibrated and corrected based on the distance information, to finally obtain a tunnel lining surface image of the same region.

In step S5, a specific image processing method is as follows:

S501. The three-dimensional modeling and deformation inspection module obtains contour and deformation information of a tunnel lining structural surface; the crack and peeling-off inspection module obtains image information of a visible light waveband of a target region; the leakage inspection module obtains image information of an infrared optical waveband of the target region on the tunnel lining structural surface; and the laser ranging module obtains information about a distance between the target region on the tunnel lining structural surface and the multifunctional gimbal.

S502. Image data acquired by the inspection modules is preprocessed, so that resolutions and sizes of the visible light image and the infrared image are the same, and a range of an angle between upper and lower boundaries of the image and an actual distance between left and right boundaries of the image can be obtained based on distance information of laser ranging; discrete sampling is performed on the captured consecutive images by using the foregoing information, to obtain sampling images in different segments and at different angles; and the sampling images may be divided into visible light sampling images and infrared sampling images.

S503. Defect recognition and marking is separately performed on the visible light sampling image and the infrared sampling image by using a semantic segmentation neural network.

S504. After a tunnel three-dimensional model is obtained, the sampling images are connected end to end and left to right based on corresponding multifunctional gimbal elevation angle information and vehicle driving position information, and are attached at corresponding positions of the tunnel three-dimensional model.

S505. Tunnel lining surface defect result analysis is performed and includes: scoring the defect severity according to measured geometrical parameters of defects of cracks, peeling-off, and leakage, where the score is positively related to danger levels; and calculating a sum of scores of all defects in a comprehensive defect image obtained after data overlaying, and sorting according to scores.

In S505, a crack and peeling-off image captured by visible light is used as a base map, a leakage defect possibly appears in an additional infrared image, and geometrical parameters of all defects are estimated based on distance information and the scoring is performed according to danger levels.

Each image records position information obtained by the smart moving carrier and angle information obtained by the multifunctional gimbal, and then outputs an obtained result to the client.

Through comprehensive defect scoring and three-dimensional visualization, a maintenance person can quickly determine a priority of a defect degree, and quickly position a corresponding position of the defect, helping in-time maintenance.

After obtaining tunnel defect image processing results, the controller distributes all defect data results to one master client and a plurality of slave clients. The master client is composed of a computer, and the slave client may be a mobile phone or a computer. The master client is also responsible for receiving vehicle operation information, including battery fuel residual, battery temperature, service life, and vehicle position and speed. Generally, the tunnel inspection vehicle works according to a preset program, but in the case of special circumstances or human intervention, the tunnel inspection vehicle performs execution preferentially according to an instruction sent by the master client, and the priority of the instruction is highest. The method can ensure that the processing information is simultaneously sent to an inspection party and a maintenance party, to improve the processing efficiency of the tunnel surface lining defects.

In this embodiment, a plurality of defect inspection modules including a laser ranging module, visible light imaging and infrared imaging modules, and a laser radar are used; the "multi-eye" gimbal is set up, the laser ranging module is used as the center, and the distance measured by the laser ranging module from the measured surface is used as reference, to correct directions of the visible light camera and the infrared camera, to ensure that imaging is performed on the same target region, thereby facilitating subsequent comprehensive judgment.

In this embodiment, gravity centers of the plurality of defect inspection modules in the gimbal are allocated based on initial weights of the plurality of defect inspection modules and gravity center positions of the plurality of defect inspection modules in the gimbal, to ensure the stability of the gimbal in the running process.

In this embodiment, when inspection of a plurality of defects is performed by using the "multi-eye" gimbal, comprehensive scoring is also performed based on measured defects, and visualization is performed by using the mobile client. According to the comprehensive scoring result, a relevant maintenance person may perform work coordination according to the complexity and danger level of the defect, and preferentially process a dangerous and complex tunnel defect, thereby greatly improving the working efficiency.

In this embodiment, tunnel three-dimensional reconstruction is performed based on three-dimensional point cloud data, and defect recognition results and scoring results obtained based on visible light and infrared image inspection are overlaid into the three-dimensional model, to enable a maintenance person to quickly determine a priority of the defect degree, and quickly position a corresponding position of the defect for maintenance.

In this embodiment, lithium batteries are introduced into tunnel inspection, to avoid frequent charging, thereby improving the inspection efficiency.

Embodiment 4

Figure 12:
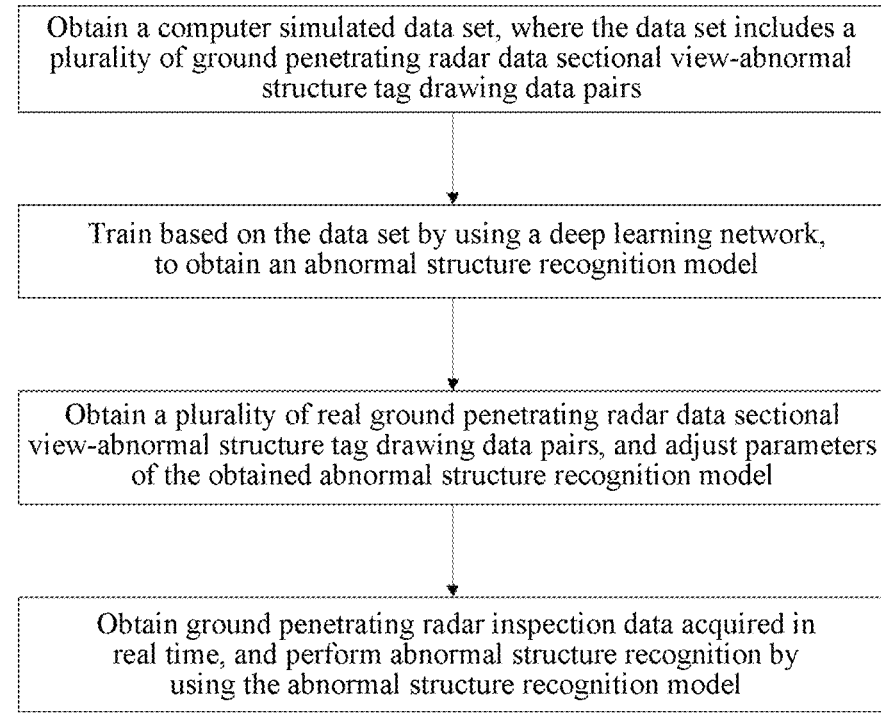
FIG. 12 is a flowchart of a ground penetrating radar intelligent recognition method according to an embodiment of the present disclosure.

Both Embodiment 1 and Embodiment 2 relate to ground generating radars. This embodiment provides a deep learning-based ground penetrating radar intelligent recognition method, for inspecting a target such as a defect based on a ground penetrating radar signal in a defect inspection process, and the method includes the following steps:

A ground penetrating radar based underground engineering target intelligent recognition method, as shown in FIG. 12, includes the following steps:

Step S1. Obtain a computer simulated data set, where the data set includes a plurality of ground penetrating radar data sectional view-target tag drawing data pairs.

The recognition method of this embodiment is mainly aimed at concealed abnormal bodies or defects, including concrete, reinforcing bar, and structural defects of underground engineering. Each type of target body is assigned with a unique type identification code. Certainly, the recognition method of this embodiment can also be applied to geological abnormal bodies such as fractures, karst caves, and faults, pavement defects such as pavement cracks and subsidence, and various underground pipelines.

Figure 13:
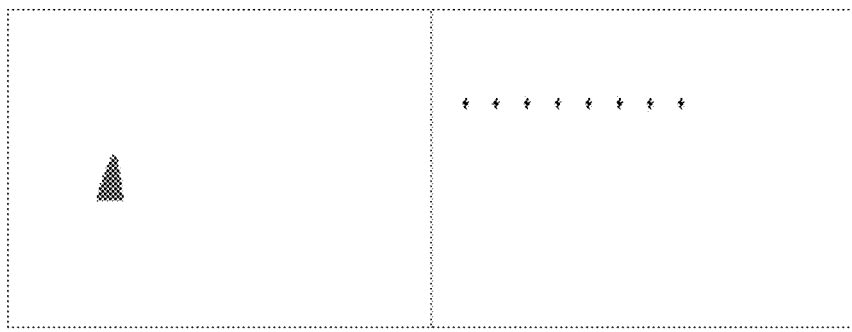
FIG. 13 shows an underground structural model of an established simulated data set according to an embodiment of the present invention.
Figure 14:
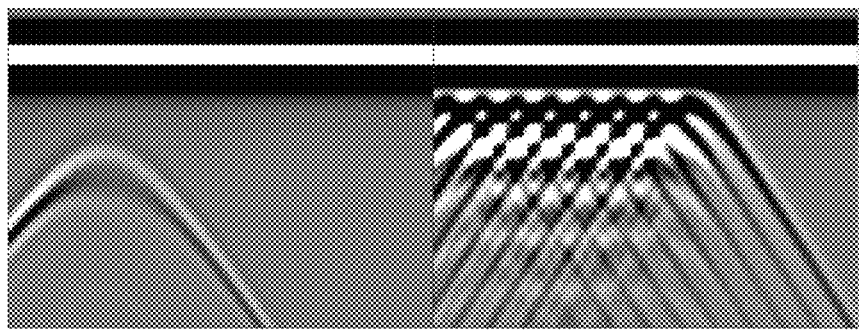
FIG. 14 shows ground penetrating radar inspection data of an established simulated data set according to an embodiment of the present invention.

FIG. 13 and FIG. 14 are respectively a concealed target tag drawing and a ground penetrating radar data sectional view in a computer simulated data set. A method for constructing a plurality of ground penetrating radar data sectional view-target tag drawing data pairs includes:

simulating dielectric constant models of underground engineering targets of a plurality of background media, shapes, sizes, and distributions;

performing forward modeling on each dielectric constant model, to separately generate ground penetrating radar data sectional views of different frequencies, to obtain a plurality of ground penetrating radar data sectional view-target dielectric constant model data pairs; and performing contour recognition on a target dielectric constant model in each ground penetrating radar data sectional view-target dielectric constant model data pair, and assigning a corresponding type identification code to a pixel value within a contour range, to obtain the plurality of ground penetrating radar data sectional view-target tag drawing data pairs.

In the tag drawing, pixel-level marking is performed on the target according to the type of the target, and contours of different types of targets are distinguished by using different pixel values.

Step S2. Construct a ground penetrating radar intelligent recognition deep learning network architecture.

The ground penetrating radar intelligent recognition deep learning network is composed of a total of 16 layers, including three parts, namely, a six-layered time dimension compression network structure, a four-layered spatial distribution feature self-encoding network structure, and a six-layered tag drawing decoding network structure.

Figure 15:
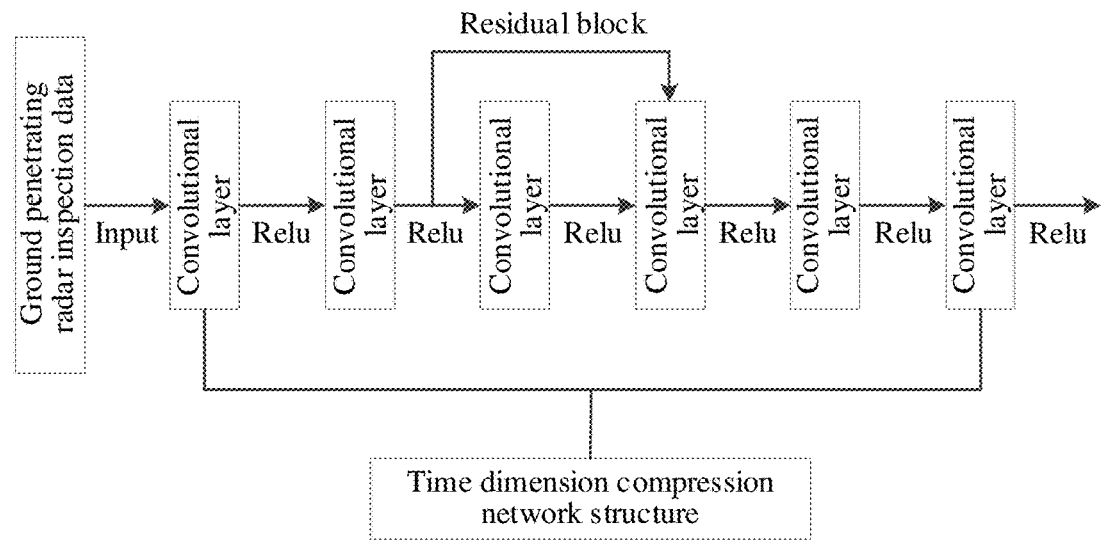
FIG. 15 shows a constructed time dimension compression network structure according to an embodiment of the present invention.

As shown in FIG. 15, in this embodiment, the time dimension compression network structure is configured to extract features of ground penetrating radar inspection data. The six-layered time dimension compression network structure is composed of 3*1 and 3*3 convolution structures and a residual block. Each layer of convolution structure includes two convolution operations (namely, convolution operation is performed twice); the first convolution operation uses 3×1 convolution and a stride of 2 to compress the time dimension, and the second convolution operation uses 3×3 convolution and a stride of 1 to stabilize features. The residual block connects an output of the second-layer convolution to the fourth-layer convolution, to prevent gradient disappearance and resolve the network degradation problem. It can be learned with reference to FIG. 15 and FIG. 16 that, a ground penetrating radar reflection signal of an abnormal body appears in the shape of a parabola in the ground penetrating radar sectional view, and one parabola corresponds to one defect. Because a data volume of a ground penetrating radar sectional view input to a deep neural network in the time dimension is generally far greater than a data volume thereof in the spatial dimension, feature extraction is performed by directly using conventional convolution (for example, 3*3 or 5*5 convolution). Consequently, the integrity of feature extraction of the abnormal body can be hardly ensured. Therefore, time dimension compression is first performed by using one-dimensional convolution, to resolve the problem that data volumes of the time dimension and the spatial dimension are imbalanced, to ensure integral extraction of target reflection signal features, and the number of the extracted features is consistent with the number of targets in a target tag drawing output as a model.

Figure 16:
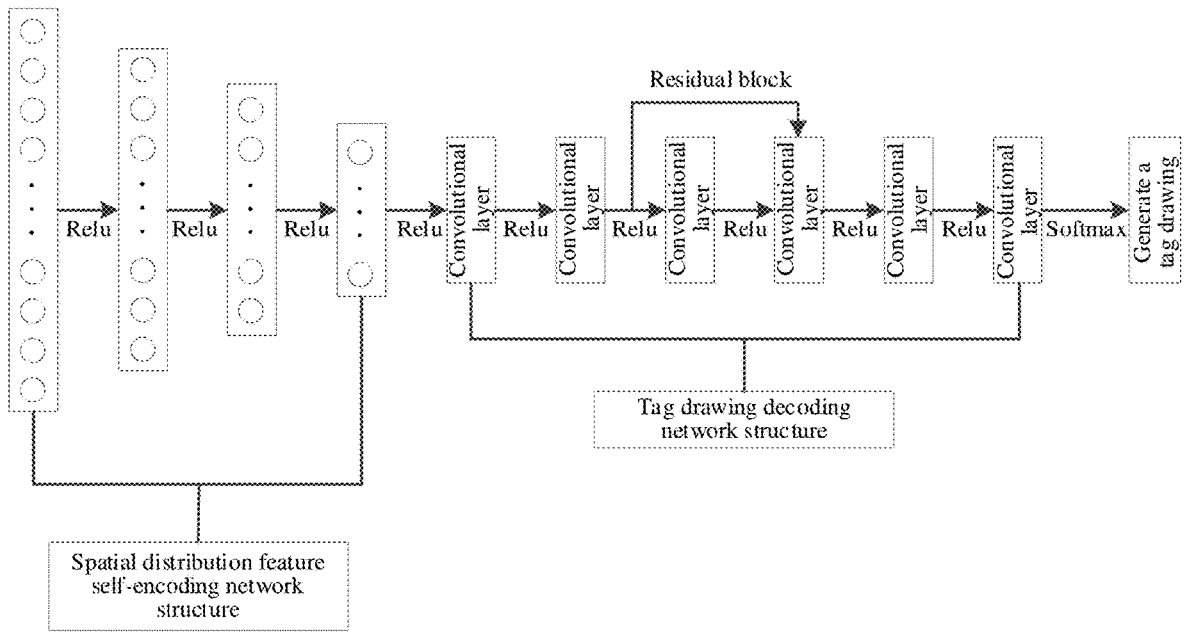
FIG. 16 shows a constructed network structure of spatial distribution feature self-encoding and tag drawing decoding according to an embodiment of the present invention.
Figure 17:
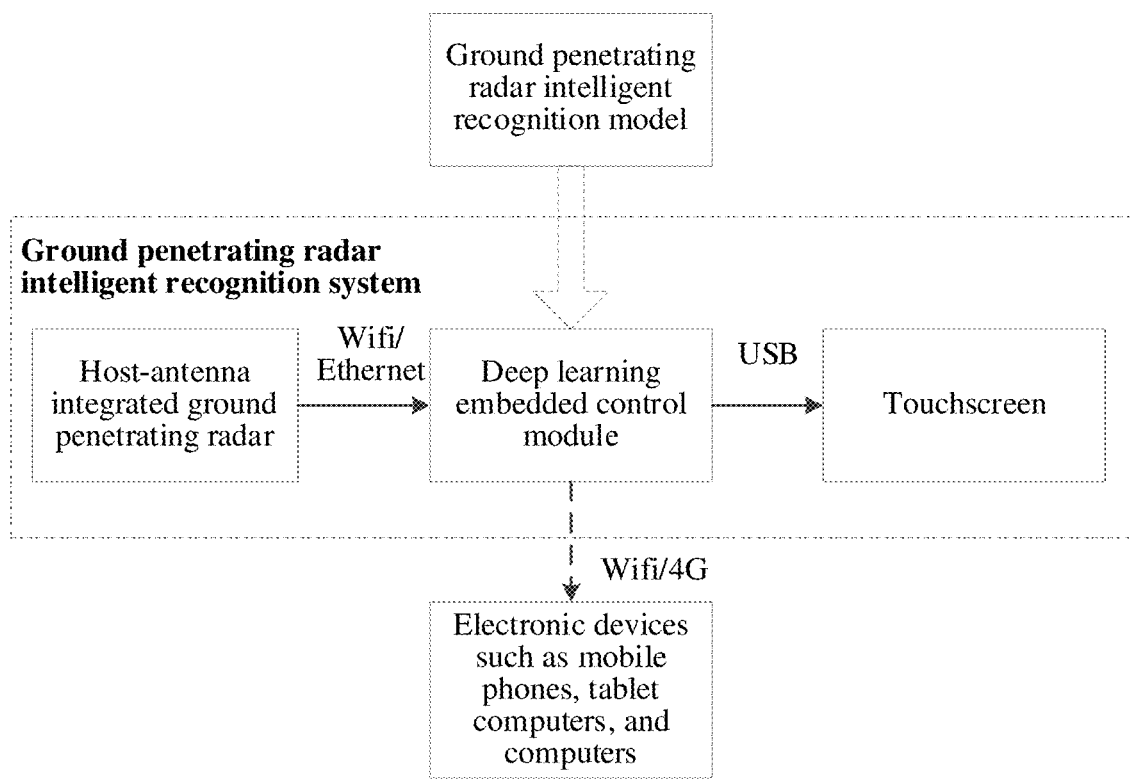
FIG. 17 shows a ground penetrating radar intelligent recognition system according to an embodiment of the present invention.

FIG. 16 shows a self-encoder network structure composed of four fully-connected layers and a six-layered tag drawing decoder network structure composed of up convolution and a residual block. The four-layered self-encoder separately encodes each feature channel, and automatically learns spatial correspondence between a ground penetrating radar inspection data sectional view in each feature channel and a target in the target tag drawing. The self-encoding network structure separately extracts, by using a fully-connected structure, each layer of feature extracted after time compression, automatically learns spatial correspondence between the abnormal body type and the ground penetrating radar transmitting signal for each layer of feature, and generates a feature map with the same size and dimension as the tag drawing, to facilitate decoding. The six-layered decoder upsamples a feature map output by the self-encoder by using convolution with a convolution kernel size of 4*4 or 3*3. The residual block connects an output of the twelfth-layer convolution (the second-layer convolution of the decoder) to the fourteenth-layer convolution (the fourth-layer convolution of the decoder), to prevent gradient disappearance and resolve the network degradation problem, to construct a finally recognized tag drawing.

Step S3. Train a deep learning model, and obtain a parameter of the deep learning model, to obtain a target recognition model.

The deep learning model is trained by using a computer simulated data set and by using Focal Loss or a combination of Cross-Entropy Loss and Lovasz-Softmax Loss as a loss function. The computer simulated data set is composed of ground penetrating radar data with a plurality of frequencies and a corresponding concealed target tag drawing, which are input into the deep learning model together for training the deep learning model.

Step S4. Obtain a plurality of real ground penetrating radar data sectional view-target tag drawing data pairs, and fine-tune model parameters, to obtain a ground penetrating radar intelligent recognition model applicable to real data.

The plurality of real ground penetrating radar data sectional view-target tag drawing data pairs are obtained as a test set. Specifically, a real exploratory ground penetrating radar inspection data sectional view is marked according to a target therein, to obtain the target tag drawing. Model parameters that are trained by using different loss functions are fine-tuned separately by using a small amount of real data, to obtain two ground penetrating radar intelligent recognition models applicable to real data. Performance of the ground penetrating radar intelligent recognition models may be evaluated by using evaluation indicators such as a confusion matrix, PA, MPA, MIoU, and FWIoU.

Based on the foregoing method, this embodiment further provides a ground penetrating radar based underground engineering target recognition system. As shown in FIG. 19, the system includes a host-antenna integrated ground penetrating radar, an embedded control module, and a touchscreen. The integrated ground penetrating radar is connected to the embedded control module. The touchscreen is connected to the embedded control module. A ground penetrating radar intelligent recognition model is embedded in the embedded control module.

The integrated ground penetrating radar is connected to the embedded control module in two data transmission manners, namely, Ethernet or wireless Wifi.

The touchscreen and the embedded control module are connected by using a USB, to realize two-way communication and human-computer interaction.

The embedded control module has an extended communication interface, and a PCIe interface is connected to a 4G module. Real-time ground penetrating radar inspection data and recognition results are transmitted to electronic devices such as mobile phones, tablets, and computers by using Wifi or 4G, to realize real-time display of an underground engineering structure.

The touchscreen is configured to input start and stop control instructions, acquisition mode selection, and piece number setting that are acquired by the ground penetrating radar, and output and display the ground penetrating radar inspection data and recognition results. Acquisition modes of the ground penetrating radar include a time mode and a distance mode. The user may choose between these two modes and set the number of pieces of data acquired by the ground penetrating radar. The ground penetrating radar inspection data reaching the specified piece number will be transmitted to the deep learning embedded control module for recognition.

Figure 18:
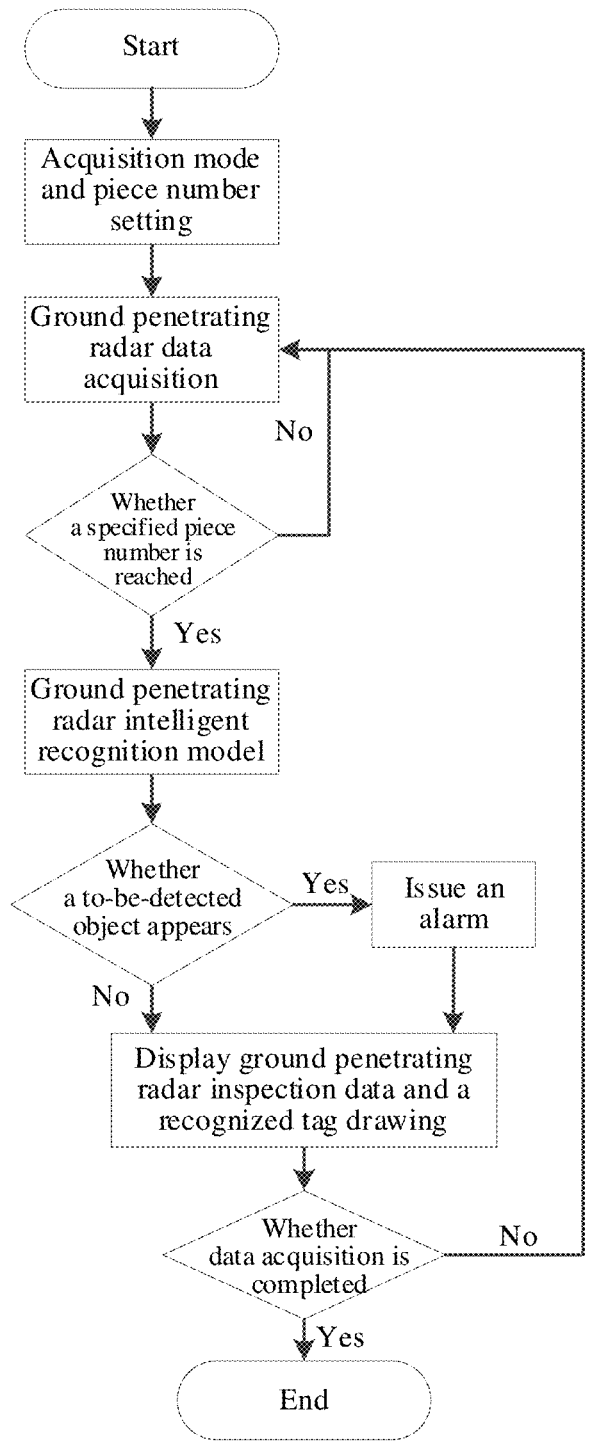
FIG. 18 is a working flowchart of a ground penetrating radar intelligent recognition system according to an embodiment of the present invention.

As shown in FIG. 18, a working method of the ground penetrating radar intelligent recognition system includes the following steps:

Step 1: The system is powered on, and the embedded control module transmits start and stop control, acquisition mode selection, piece number setting and other man-machine interaction instructions to the touchscreen for display, and the touchscreen receives the user's selection of the ground penetrating radar acquisition mode and the setting of the number of pieces of data transmitted by the ground penetrating radar, generates a startup instruction and sends it to the embedded control module to control the integrated ground penetrating radar to start the inspection work.

Step 2: The embedded control module receives the data collected by the ground penetrating radar in real time, and determines whether the data has reached the piece number set by the user. If the piece number is reached, the data is transmitted to the ground penetrating radar intelligent recognition model; if the specified piece number is not reached, acquisition continues to be performed, until the acquired data reaches the specified piece number, and then data is transmitted.

Step 3: The embedded control module performs target inspection on the received data by using the ground penetrating radar intelligent recognition model, and outputs inspection results in real time. When a target is inspected, a target tag drawing is generated, and the target tag drawing and corresponding ground penetrating radar inspection data are output and displayed, and an alarm is issued. FIG. 19(a) to FIG. 19(c), FIG. 20(a) to FIG. 20(c), and FIG. 21(a) to FIG. 21(c) are respectively schematic diagrams of inspection results for three ground penetrating radar inspection data sectional views.

The ground penetrating radar inspection data and the recognized tag drawing not only can be transmitted to the touchscreen for display, but also can be transmitted to mobile phones, tablets, computers and other electronic devices in real time by using Wifi or 4G, to realize real-time display of the underground engineering structure. Finally, whether the ground penetrating radar finishes acquiring data needs to be determined. If not, the foregoing process is continued, and after completion, the ground penetrating radar intelligent identification system ends work.

The embedded control module uses the NVIDIA Pascal™ architecture based deep learning embedded main control module NVIDIA® Jetson™ with high performance and low power consumption. The embedded operating system has features such as high performance, small size, and low power consumption. The system may be loaded with the Ubuntu system and embedded with deep learning algorithms. The system directly runs PyTorch framework based neural networks, to control acquisition of ground penetrating radar inspection data, display of the ground penetrating radar inspection data and the recognized tag drawing, and data transmission.

Refer to the related descriptions of Embodiment 1 for details of the target recognition method in step 3.

This embodiment further provides an electronic device, including a memory, a processor, and a computer program stored in the memory and capable of being run on the processor, where the processor implements the foregoing method when executing the program.

This embodiment further provides a computer-readable storage medium, storing a computer program, where steps of the foregoing method are implemented when the program is executed by a processor.

The ground penetrating radar inspection data-based target recognition model is established in this embodiment, so that real-time inspection for an abnormal target can be implemented in a ground penetrating radar inspection process.

In this embodiment, the ground penetrating radar inspection view-target tag drawing data pairs are obtained by means of simulation as training data, and ground penetrating radar inspection sectional views and target tag drawings for underground engineering targets of a plurality of background media, shapes, sizes, and distributions are obtained, so that there is a sufficient data volume of training data, and guarantee is provided for subsequent model generalization capabilities. In addition, real data pairs are also obtained after model training as test data to adjust parameters of the model obtained through training, to ensure that the target recognition model applicable to ground penetrating radar inspection data of a real environment can be obtained.

In this embodiment, when feature learning is performed for the ground penetrating radar inspection data, time dimensional compression is first performed by using one-dimensional convolution, to resolve the problem that data volumes of the time dimension and the spatial dimension are imbalanced, ensure integral and accurate extraction of target reflection signal features, provide guarantee for learning subsequent feature spatial correspondence, and ensure the model precision.

This embodiment further provides a target recognition system that can accurately recognize a contour of a target in a sectional view, and can also restore the shape of an underground engineering target through continuous inspection of a ground penetrating radar sectional view.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

What is claimed is:

1. A multi-scale inspection and intelligent diagnosis system for tunnel structural defects, comprising:
   a traveling section;
   a supporting section, disposed on the traveling section, and comprising a rotatable telescopic platform, wherein two mechanical arms working in parallel are disposed on the rotatable telescopic platform, one of the two mechanical arms being a multi-joint snake-shaped mechanical arm, and the other being a load measuring arm with a built-in inspection device;
   an inspection section, mounted on the supporting section, and configured to perform multi-scale inspection on surface defects and internal defects in different depth ranges of a same position of a tunnel structure, and transmit inspected defect information to a control section, the inspection section including:
      a laser 3D scanner, mounted on the rotatable telescopic platform, and configured to acquire tunnel panorama image information comprising defects of cracks and water leakage on a tunnel lining surface;
      a ground penetrating radar and an ultrasonic imaging device which are placed on a top end of the multi-joint snake-shaped mechanical arm, wherein the ground penetrating radar is configured to obtain defects of deeper layers, and the ultrasonic imaging device is configured to obtain depths and widths of the cracks on the tunnel lining surface; and
      an X-ray backscattering device, built in the load measuring arm with the built-in inspection device, and configured to perform millimeter-level measurement on an inside of the cracks on the tunnel lining surface; and
   the control section, configured to:
      construct a deep neural network-based defect diagnosis model;
      construct a data set by using historical surface defect and internal defect information and a marked pixel-level defect type, and train the deep neural network-based defect diagnosis model; and
      receive defect information in real time and input the received defect information into a trained defect automatic recognition and diagnosis model, and automatically recognize a type, a position, and a contour of a defect.

2. The multi-scale inspection and intelligent diagnosis system for tunnel structural defects according to claim 1, wherein the traveling section comprises a robot platform, tracks are disposed on two sides of the robot platform, several telescopic rail wheels are further symmetrically disposed on a bottom of the robot platform, and the telescopic rail wheels perform joint telescopic movement by using a linkage mechanism, to implement operation in tunnels with different hole diameters.

3. The multi-scale inspection and intelligent diagnosis system for tunnel structural defects according to claim 1, wherein the control section is further configured to:
   store the defect information received in real time and the automatically recognized defect type into a historical database;
   train the defect diagnosis model again by using data in the historical database, to obtain an updated defect diagnosis model; and perform defect diagnosis by using the updated defect diagnosis model.

4. The multi-scale inspection and intelligent diagnosis system for tunnel structural defects according to claim 1, wherein the control section is further configured to:
  position and frame a tunnel environment, and perform path planning on the traveling section.

* * * * *